(12) United States Patent
Gupta et al.

(10) Patent No.: US 11,531,712 B2
(45) Date of Patent: Dec. 20, 2022

(54) UNIFIED METADATA SEARCH

(71) Applicant: Cohesity, Inc., San Jose, CA (US)

(72) Inventors: Anubhav Gupta, Sunnyvale, CA (US); Subramanian Sethumadhavan, San Jose, CA (US); Naga Venkata Sai Indubhaskar Jupudi, Milpitas, CA (US); Jeffrey Howard, Wichita, KS (US); Manvendra Tomar, Bangalore (IN); Yu-Shen Ng, Mountain View, CA (US)

(73) Assignee: Cohesity, Inc., San Jose, CA (US)

( * ) Notice: Subject to any disclaimer, the term of this patent is extended or adjusted under 35 U.S.C. 154(b) by 149 days.

(21) Appl. No.: 16/368,684

(22) Filed: Mar. 28, 2019

(65) Prior Publication Data

US 2020/0311137 A1  Oct. 1, 2020

(51) Int. Cl.
*G06F 16/907* (2019.01)
*G06F 16/901* (2019.01)
*G06F 3/06* (2006.01)
*G06F 16/904* (2019.01)

(52) U.S. Cl.
CPC .......... *G06F 16/907* (2019.01); *G06F 3/0604* (2013.01); *G06F 3/067* (2013.01); *G06F 3/0644* (2013.01); *G06F 16/901* (2019.01); *G06F 16/904* (2019.01)

(58) Field of Classification Search
CPC .... G06F 16/907; G06F 16/901; G06F 3/0644; G06F 3/067; G06F 3/0604; G06F 16/904; G06F 16/14; G06F 16/11
See application file for complete search history.

(56) References Cited

U.S. PATENT DOCUMENTS

| | | | |
|---|---|---|---|
| 6,219,700 B1 | 4/2001 | Chang | |
| 7,343,453 B2 | 3/2008 | Prahlad | |
| 8,863,297 B2 | 10/2014 | Sharma | |
| 9,330,107 B1 | 5/2016 | Kesselman | |
| 10,303,797 B1 | 5/2019 | Menezes | |
| 10,476,757 B1 | 11/2019 | Gueco | |
| 10,845,997 B2 | 11/2020 | Alluboyina | |
| 10,969,959 B2 | 4/2021 | Somasundaram | |
| 2003/0172356 A1 | 9/2003 | Pulkkinen | |
| 2005/0198006 A1 | 9/2005 | Boicey | |
| 2010/0332456 A1* | 12/2010 | Prahlad | G06F 16/1748 713/160 |
| 2011/0022812 A1 | 1/2011 | Van Der Linden | |
| 2012/0173919 A1 | 7/2012 | Patel | |
| 2013/0185384 A1 | 7/2013 | Menon | |
| 2015/0172120 A1 | 6/2015 | Dwarampudi | |
| 2015/0199367 A1* | 7/2015 | Hammer | G06F 16/1748 707/654 |

(Continued)

*Primary Examiner* — Ashish Thomas
*Assistant Examiner* — Yohanes D Kelemework
(74) *Attorney, Agent, or Firm* — Van Pelt, Yi & James LLP

(57) ABSTRACT

Metadata associated with content stored in a corresponding primary storage system is received receiving from each secondary storage cluster of a plurality of different secondary storage clusters included in different storage domains. The metadata received from the plurality of different secondary storage clusters is stored and indexed together. A unified metadata search interface is provided for stored data of the corresponding primary storage systems and the plurality of different secondary storage clusters of the different storage domains.

21 Claims, 19 Drawing Sheets

(56) References Cited

U.S. PATENT DOCUMENTS

| | | |
|---|---|---|
| 2015/0227602 A1* | 8/2015 | Ramu ................. G06F 11/1456 707/634 |
| 2016/0099844 A1 | 4/2016 | Colgrove |
| 2016/0142483 A1 | 5/2016 | Nallathambi |
| 2016/0188621 A1* | 6/2016 | Karinta ................. G06F 16/951 707/827 |
| 2016/0218936 A1 | 7/2016 | Shehter |
| 2017/0060918 A1* | 3/2017 | Iyer ....................... G06F 3/0631 |
| 2017/0235507 A1 | 8/2017 | Sinha |
| 2017/0279871 A1 | 9/2017 | Wu |
| 2018/0159929 A1 | 6/2018 | Heckle |
| 2018/0285214 A1* | 10/2018 | Ashraf ................ G06F 11/1448 |
| 2019/0018844 A1 | 1/2019 | Bhagwat |
| 2019/0227877 A1 | 7/2019 | Pandey |
| 2020/0034245 A1 | 1/2020 | Kohler |
| 2020/0092286 A1 | 3/2020 | Han |
| 2020/0204449 A1 | 6/2020 | Bitterfeld |
| 2021/0334206 A1 | 10/2021 | Colgrove |

* cited by examiner

FIG. 13

COHESITY All Clusters ∨     Dashboard   Protection   Monitoring   Platform   Admin   More ∨

Search: [test] 🔍

Refine by

Type
- ☐ Virtual Infrastructure
- ☐ Storage Volume
- ☐ Database
- ☐ Physical Server
- ☐ Cohesity View

Status
- ☐ Protected
- ☐ Unprotected

Last Run
- ☐ Success
- ☐ Error

- 💿 test_anirban_vmware1
  Size: 16 GiB
- 💿 chin-test
  Size: 9 GiB
- 💿 anirban-sys-test
  Size: 100 TiB
- 💿 testVolume — 1304
  Size: 1 GiB
- 💿 Pure03-QA-Solutions-Test-HCL-Vol1_c89956-7518 — 1302
  Size: 1.4 TiB
- 💿 test2anirban_vmware2
  Size: 18 GiB
- 💿 Pure03-QA-Solutions-Test-HCL-Vol1
  Size: 1.4 TiB
- 💿 test_vijay_mixed
  Size: 5 GiB
- 💿 test_autoProtect_volume
  Size: 3 GiB
- 💿 test_vol
  Size: 25 GiB
- 💿 Test001
  Size: 11 GiB

💿 testVolume

Type     NAS (NetApp Volume)
NAS (NetApp    SRE_NETAPP
Cluster)
Clusters     BlrCluster
             edison
             einstein

Snapshots

| Location | Snapshots | Latest Snapshot |
|---|---|---|
| 📷 BlrCluster | 1 | 22 days ago |

Cluster Management

| Cluster ▲ | Cluster ID | Type | Nodes | Storage Capacity | Health | Connected | Version |
|---|---|---|---|---|---|---|---|
| ☐ BlrCluster | 2690990343931928 | Physical | 3 | 22 GiB of 16.7 TiB | ⊘ | •Yes | master |
| ☐ cohesity-vSANReady | 4753914011867584 | Physical | 4 | 90.6 GiB of 88.6 TiB | ⊘ | •Yes | 6.2 |
| ☐ democluster | 4590240874833370 | - | - | -of- | ⊘ | ◦No | - |
| ☐ edison | 3358568177796484 | Cloud Edition | 1 | 619.1 GiB of 13.1 TiB | ⓘ | •Yes | 6.2 |
| ☐ einstein | 3773445208992781 | Cloud Edition | 1 | 304.3 GiB of 13.1 TiB | ⊘ | •Yes | 6.2 |
| ☐ everest | 8374834709413972 | Cloud Edition | 1 | 72.1 GiB of 13.1 TiB | ⓘ | •Yes | 6.1.1d |
| ☐ tme-cluster-02 | 1616226053966050 | Physical | 4 | 767.7 GiB of 89.7 TiB | ⓘ | •Yes | 6.2 |

FIG. 18

UNIFIED METADATA SEARCH

BACKGROUND OF THE INVENTION

A storage domain may be comprised of a primary storage system and a secondary storage cluster. A user associated with the storage domain may remotely access and manage the primary storage system and/or the secondary storage cluster via a remote connection (e.g., virtual private network connection). An enterprise may be associated with a plurality of storage domains having different physical locations. The user may remotely access and manage each of the plurality of storage domains, however, a separate remote connection with a separate interface is often required for each of the storage domains.

BRIEF DESCRIPTION OF THE DRAWINGS

Various embodiments of the invention are disclosed in the following detailed description and the accompanying drawings.

FIG. 13 is an example of a user interface in accordance with some embodiments.

FIG. 14 is an example of a user interface in accordance with some embodiments.

FIG. 16 is an example of a user interface in accordance with some embodiments.

FIG. 18 is an example of a user interface in accordance with some embodiments.

DETAILED DESCRIPTION

Figure 1:
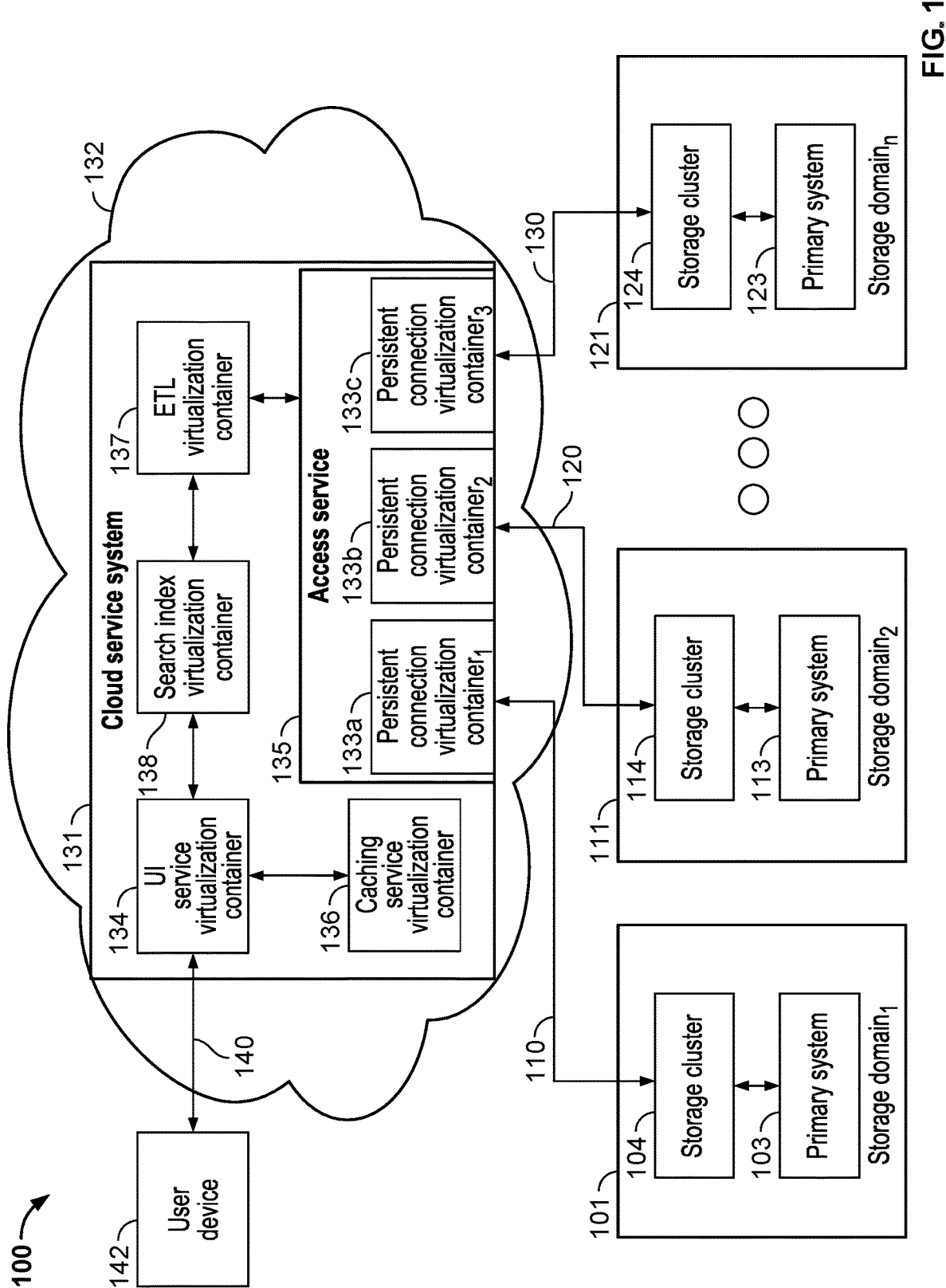
FIG. 1 is a block diagram illustrating a system for providing a unified metadata search interface and a central storage management interface for a plurality of storage domains in accordance with some embodiments.

An enterprise may be associated with a plurality of storage domains located at different locations. For example, a first storage domain may be located in New York, a second storage domain may be located in Los Angeles, a third storage domain may be located in Singapore, and a fourth storage domain may be located in Paris. A storage domain may be comprised of a primary storage system and a storage cluster. Each storage domain may store a plurality of files and different types of files (e.g., virtual machines, database files, content files, etc.).

A user associated with the enterprise may desire to remotely search content associated with the plurality of storage domains. The user may establish a separate virtual private network (VPN) connection to each of the plurality of storage domains to search content associated with a particular storage domain. However, this requires separate searches on each of the plurality of storage domains. The user may desire to determine whether multiple copies of a particular file is stored in the plurality of storage domains, but to perform such a determination, the user would have to search each individual storage domain and determine whether the particular file is stored in each of the storage domains.

The user associated with the enterprise may be able to perform a global search of the plurality of objects (e.g., file, virtual machine (VM), database, server, etc.) associated with the plurality of storage domains using a unified metadata search interface associated with a cloud service system. For example, the user may search for a particular file via the unified metadata search interface and the cloud service system may notify the user of the one or more storage domains that store a copy of the particular file.

The user associated with the enterprise may register with the cloud service system one or more storage clusters. A storage cluster of a storage domain may store a backup of one or more objects stored on or previously stored on a primary storage system of the storage domain. In some embodiments, the storage cluster is configured to be a secondary storage system for the primary storage system. In other embodiments, the storage cluster is configured to be a storage system for a user associated with the storage cluster (e.g., directly store one or more objects generated on the storage cluster). The storage cluster of the storage domain may have access to metadata associated with a plurality of objects stored in the primary storage system. For example, the primary storage system may provide the storage cluster a list of one or more objects stored on the primary system. The list may include the metadata associated with the one or more objects. The storage cluster may provide to the cloud service system metadata associated with a plurality of objects stored in the primary storage system and metadata associated with a plurality of objects stored in the storage cluster. The storage clusters associated with one or more other storage domains of the enterprise may also provide to the cloud service system metadata associated with a plurality of objects stored in the corresponding primary storage system and metadata associated with a plurality of objects stored in the corresponding storage cluster.

In response to receiving the metadata from one or more storage clusters, the cloud service system may perform an ETL (extract, transform, load) process on the received metadata and consolidate a result of the ETL process in an index that is searchable by a search engine (e.g., a distributed multitenant-capable full-text search engine). This may enable a user associated with the enterprise to perform a global search of the plurality of objects associated with the plurality of storage domains using a unified metadata search interface associated with the cloud service system.

A storage cluster may initially send to the cloud service system all of the metadata associated with a plurality of objects stored in the primary storage system and all of the metadata associated with a plurality of objects stored in the storage cluster. The cloud service system may generate a searchable index based on the metadata, however, the searchable index may become out-of-date because one or more objects in the primary storage system and/or the storage cluster may be subsequently deleted, modified, or added.

To ensure that the searchable index is up-to-date within a threshold duration (e.g., 15 minutes), the storage cluster may be configured to provide the metadata associated with a plurality of objects stored in the primary storage system and the metadata associated with a plurality of objects stored in the storage cluster according to an update policy. Each storage cluster may have its own corresponding update policy and may provide metadata to the cloud service system at different rates. The update policy may indicate that a storage cluster is configured to provide to the cloud service system the metadata associated with a plurality of objects stored in the primary storage system and the metadata associated with a plurality of objects stored in the storage cluster on a periodic basis (e.g., every five minutes, every ten minutes, every fifteen minutes, etc.). The update policy may indicate that an incremental set of metadata is to be provided to the cloud service system after the initial set of metadata. The storage cluster may reduce the amount of bandwidth used to send the metadata to the cloud service system from the storage cluster by sending an incremental set of metadata instead of sending the full set of metadata. Sending an incremental set of metadata may also reduce the overall amount of time to keep the searchable index up-to-date because the cloud storage system may be processing less data to update the searchable index. The metadata to be included in the incremental set of metadata may be determined based on a timestamp associated with the metadata. For example, the storage cluster may provide the metadata for objects having a timestamp later than a timestamp associated with a last update. In some embodiments, the update policy indicates that a storage cluster is configured to provide to the cloud service system the metadata associated with a plurality of objects stored in the primary storage system and the metadata associated with a plurality of objects stored in the storage cluster after a threshold amount of metadata has changed. In some embodiments, the update policy indicates that a storage cluster is configured to provide to the cloud service system the metadata associated with a plurality of objects stored in the primary storage system and the metadata associated with a plurality of objects stored in the storage cluster in response to a command from a user associated with the enterprise. In other embodiments, the update policy indicates that a storage cluster is configured to provide to the cloud service system the metadata associated with a plurality of objects stored in the primary storage system and/or the metadata associated with a plurality of objects stored in the storage cluster any time the metadata associated with a plurality of objects stored in the primary storage system or the metadata associated with a plurality of objects stored in the storage cluster has changed.

A user associated with an enterprise may be able to use a unified metadata search interface associated with the cloud service system to perform a global search for any object in the one or more storage domains associated with the enterprise. The cloud service system may search for the object using one or more metadata attributes associated with an object. The one or more metadata attributes associated with an object may include, but are not limited to, file name, network name, internet protocol (IP address), VM type, application type, application name, operating system (OS) name, OS type, date backed up, file size, location (e.g., which system stores the object), etc. A unified metadata search interface of the cloud service system may, for example, receive from a user associated with an enterprise, a request for one or more objects associated with an OS of Windows 10. In response to the request, the cloud service system may determine the one or more objects associated with the OS of Windows 10 and provide via the unified metadata search interface associated with the cloud service system a notification of the one or more determined objects.

Previously, a user associated with the enterprise had to be physically on-premises at a storage domain to cause the one or more backup jobs associated with the one or more objects of the storage domain to be performed. However, the cloud service system may enable the user associated with the enterprise to remotely cause the one or more backup jobs associated with the one or more objects of the storage domain to be performed. In addition to providing a unified metadata search interface, the cloud service system may provide a central storage management interface for a plurality of different storage clusters included in different storage domains and receive an indication of a storage cluster (e.g., a selection). In response to the indication, the cloud service system may provide an indication of the one or more available backup jobs associated with the indicated storage cluster. The one or more available backup jobs may be different depending upon the indicated storage cluster because the storage clusters associated with an enterprise may have different backup capabilities. For example, a first storage cluster may be associated with a first version of a storage cluster and a second storage cluster may be associated with a second version of the storage cluster. The one or more available backup jobs associated with the first version of the storage cluster may be different than the one or more available backup jobs associated with the second version of the storage cluster. The second version of the storage cluster may include the one or more available features (e.g., backup jobs) associated with the first version of the storage cluster and one or more features not available with the first version of the storage cluster, e.g., the second version of the storage cluster is an upgrade of the first version of the storage cluster.

The central storage management interface of the cloud service system may enable a user associated with the enterprise to remotely access any registered storage cluster associated with the enterprise. The cloud service system may provide a user interface for an indicated storage cluster. A registered storage cluster may be a particular version of the storage cluster. Each version of the storage cluster may have a different version of a native user interface. Providing a user interface that is different from the user interface of an indicated storage cluster may confuse the user associated with the enterprise. For example, the user may desire to perform a particular backup job via the central storage management interface. The on-premises storage cluster may provide a particular user interface that requires the user to interact with the particular user interface in a particular manner to cause the particular backup job to be performed. If the central storage management interface associated with the cloud service system is provided a different user interface, then the user associated with the enterprise may waste time interacting with the central storage management interface to figure out how to cause the particular backup job to be performed. In a worst case scenario, the user associated with the enterprise may give up and decide against performing the particular backup job because the central storage management interface associated with the cloud service system was too confusing.

The cloud service system may provide a central storage management interface that is configured to provide the version of the native user interface associated with an indicated storage cluster. When a user associated with an enterprise registers a storage cluster with the cloud service system, the storage cluster may provide configuration information associated with the storage cluster to the cloud service system. The configuration information may include native user interface version information associated with the storage cluster. The cloud service system may store corresponding user interface code associated with each user interface version of the storage cluster.

The cloud service system may provide a central storage management interface that provides an overview screen that displays a list of available storage clusters. The central storage management interface may receive an indication (e.g., selection) of a storage cluster from a user associated with an enterprise. In response to the indicated storage cluster, the cloud service system may determine a version of the native user interface associated with the indicated storage cluster, load the user interface code associated with the determined native user interface version, and remotely execute the determined version of the native user interface. The central storage management interface may provide a user interface that enables a user associated with the enterprise to interact with the central storage management interface associated with the cloud service system as if the user were local to the user interface of the indicated storage cluster. This may also reduce any user interface confusion the user may encounter because the user interface provided by the central storage management interface is the same user interface as the indicated storage cluster.

A user associated with the enterprise may use the central storage management interface associated with the cloud service system to cause an indicated storage cluster to perform one or more backup commands. The cloud service system may be comprised of a UI service virtualization container, a caching service virtualization container, and a plurality of persistent connection virtualization containers. The central storage management interface associated with the cloud service system may be provided by comprised of a UI service virtualization container. The caching service virtualization container may store a data structure that associates a persistent connection virtualization container with a particular storage cluster. A persistent connection virtualization container may be configured to maintain bidirectional communications between the cloud service system and a storage cluster. Each storage cluster may be associated with a corresponding persistent connection virtualization container.

In response to receiving one or more commands via the central storage management interface of the cloud service system, the UI service virtualization container may be configured to request from a caching service virtualization container an identifier associated with a persistent connection virtualization container corresponding to the indicated storage cluster. The caching service virtualization container may respond to the request by inspecting (e.g., a lookup) a data structure stored by the caching service virtualization container to identify a persistent connection virtualization container associated with the indicated storage cluster. For example, the caching service virtualization container may determine an IP address of a persistent connection virtualization container that is associated with the indicated storage cluster. The caching service virtualization container may then provide the UI service virtualization container the identifier (e.g., IP address) associated with the persistent connection virtualization container corresponding to the indicated storage cluster. The UI service virtualization container may provide the one or more commands to the persistent connection virtualization container associated with the indicated storage cluster having the identifier. The persistent connection virtualization container associated with the indicated storage cluster may then forward the one or more commands to the indicated storage cluster, which in response to receiving the one or more commands, is configured to perform one or more backup jobs based on the one or more commands.

FIG. 1 is a block diagram illustrating a system for providing a unified metadata search interface and a central storage management interface for a plurality of storage domains in accordance with some embodiments. In the example shown, system 100 is comprised of storage domain 101, storage domain 111, storage domain 121, cloud environment 132 that includes a cloud service system 131, and user device 142.

An enterprise may be associated with n storage domains located at different locations. For example, an enterprise may be associated with storage domain 101, storage domain 111, and storage domain 121. Each storage domain may be comprised of a primary storage system and a storage cluster. In the example shown, storage domain 101 is comprised of primary storage system 103 and storage cluster 104, storage domain 111 is comprised of primary storage system 113 and storage cluster 114, and storage domain 121 is comprised of primary storage system 123 and storage cluster 124. In some embodiments, a storage domain is associated with cloud storage (not shown). A storage cluster of the storage domain associated with cloud storage may have a list of one or more objects associated with the storage domain that are stored in cloud storage. In some embodiments, a storage domain may include a plurality of storage clusters.

Primary storage systems 103, 113, 123 are computing systems that store file system data. The file system data may be comprised of a plurality of objects (e.g., file, virtual machine (VM), database, server, etc.) and metadata associated with the plurality of objects. Primary storage systems 103, 113, 123 may be comprised of one or more servers, one or more computing devices, one or more storage devices, and/or a combination thereof. In some embodiments, a primary storage system may provide a corresponding storage cluster a list of one or more objects stored on the primary storage system. The list may include the metadata associated with the one or more objects.

A storage cluster may cause the primary storage system to perform a backup snapshot of the file system data according to a backup policy and send the backup snapshot to the storage cluster. A backup snapshot may represent the state of the primary storage system at a particular point in time (e.g., the state of the file system data). The backup snapshot policy may require a full backup snapshot or an incremental backup snapshot to be performed. A full backup snapshot includes the entire state of the primary storage system at a particular point in time. An incremental backup snapshot includes the state of the primary storage system that has changed since a last backup snapshot. Storage clusters 104, 114, 124 may cause primary storage systems 103, 113, 123, respectively, to perform a backup snapshot of the file system data. In some embodiments, the storage cluster is configured to be a secondary storage system for the primary storage system.

A primary storage system may store one or more virtual machines. Each virtual machine may have an associated IP address. A primary storage system, such as primary storage systems 103, 113, 123, may provide to a corresponding storage cluster, such as storage cluster 103, 113, 123, a list of one or more IP addresses associated with one or more virtual machines. In some embodiments, a corresponding storage cluster may communicate with a virtual machine associated with an IP address included in the provided list. A corresponding storage cluster may back up the virtual machine associated with the IP address, determine the one or more objects associated with the backed up virtual machine, and generate an index of the one or more determined objects associated with the backed up virtual machine. The index may include one or more metadata attributes associated with the one or more determined objects associated with the backed up virtual machine.

A storage cluster may be comprised of a plurality of storage nodes. Each storage node may have a corresponding processor. A storage cluster may ingest the file system data and store the file system data across the plurality of storage nodes. For example, storage clusters 104, 114, 124 may be comprised of a corresponding plurality of storage nodes and store the file system data received from a corresponding primary storage system and across the corresponding plurality of storage nodes. In some embodiments, a storage cluster is configured to be a secondary storage cluster for a corresponding primary storage system. In other embodiments, a storage cluster is configured to be a main storage cluster for a user associated with the storage cluster. A storage cluster may be configured to store a plurality of objects generated by a user associated with the storage cluster (e.g., directly store one or more objects generated on the storage cluster). In other embodiments, a storage cluster is configured to be a secondary storage cluster for a corresponding primary storage system and a main storage cluster for a user associated with the storage cluster. A storage cluster may maintain a metadata store that is configured to store the metadata associated with the plurality of objects stored in the storage cluster. In some embodiments, a single storage node is implemented instead of a storage cluster.

A user associated with storage domains 101, 111, 121 may individually register storage domains 101, 111, 121 with cloud service system 131 to enable the user associated with storage domains 101, 111, 121 to remotely access and manage the storage domains. Cloud service system 131 may enable a user to remotely access and manage storage domains that are physically located separately throughout the world from a single location. A user may register a storage cluster of a storage domain with cloud service system using a cluster registration procedure, for example, using the procedure described herein.

Storage clusters 104, 114, 124 may be located behind corresponding firewalls. Storage clusters 104, 114, 124 may initiate communications with cloud service system 131, but the corresponding firewalls are initially configured to prevent cloud service system 131 from initiating communications with storage clusters 104, 114, 124. For example, cloud service system 131 may send corresponding requests to storage clusters 104, 114, 124, but storage clusters 104, 114, 124 won't send a reply to the corresponding request because the corresponding firewalls will block the request. To manage storage domains 101, 111, 121 via cloud service system 131, cloud service system 131 needs to initiate communications with storage clusters 104, 114, 124. Bidirectional communications 110, 120, 130 may be established between storage clusters 104, 114, 124 and persistent connection virtualization containers 133a, 133b, 133c, respectively. Establishing persistent bidirectional communications between a storage cluster and cloud service system 131 may be established, for example, using the procedure as described in Assignee's U.S. patent application U.S. Ser. No. 16/226,366, the entire contents of which are herein incorporated by reference. Persistent connection virtualization containers 133a, 133b, 133c may be used to maintain persistent connection pipes 110, 120, 130 between storage clusters 104, 114, 124, and cloud service system 131. Persistent connection virtualization containers 133a, 133b, 133c may be part of access service 152. Cloud service system may be comprised of a plurality of access services, each access services comprised of a plurality of persistent connection virtualization containers.

Caching service virtualization container 136 may record and preserve a state associated with bidirectional communications. For example, the state may include an IP address associated with a persistent connection virtualization container, a storage domain to which the persistent connection virtualization container is associated, a storage cluster identifier associated with a storage cluster, a clusterID, etc. Each time a persistent connection virtualization container establishes bidirectional communications with a storage cluster (e.g., initial bidirectional communication or re-establishing bidirectional communications), the persistent connection virtualization container may be configured to provide its associated state to caching service virtualization container 136.

Cloud service system 131 may be running in cloud environment 132. Cloud environment 132 may be a public cloud or a private cloud. For example, cloud environment 132 may be an Amazon Web Services cloud, a Microsoft Azure cloud, a Google cloud, etc.

A storage cluster may provide to cloud service system 131 metadata associated with content stored in a corresponding storage domain. A storage cluster may provide to cloud service system 131 metadata associated with a plurality of objects stored in the storage cluster and a plurality of objects stored in a primary storage system associated with the storage cluster. For example, storage cluster 104 may provide to cloud service system 131, metadata associated with a plurality of objects stored in storage cluster 104 and a plurality of objects stored in primary storage system 103. Storage cluster 114 may provide to cloud service system 131, metadata associated with a plurality of objects stored in storage cluster 114 and a plurality of objects stored in primary storage system 113. Storage cluster 124 may provide to cloud service system 131, metadata associated with a plurality of objects stored in storage cluster 124 and a plurality of objects stored in primary storage system 123.

In response to receiving the metadata from storage clusters 104, 114, 124, cloud service system 131 may perform an ETL (extract, transform, load) process on the received metadata using ETL virtualization container 137 and consolidate a result of the ETL process in an index that is searchable by search index virtualization container 138. This may enable a user associated with the enterprise to perform a global search of the plurality of objects associated with storage domains 101, 111, 121 using a unified metadata search interface of cloud service system 131.

Storage clusters 104, 114, 124 may initially send to cloud service system 131 all of the metadata associated with a plurality of objects stored in primary storage systems 103, 113, 123 and all of the metadata associated with a plurality of objects stored in storage clusters 104, 114, 124, respectively. Cloud service system 131 may generate a searchable index based on the metadata, however, the searchable index may become out-of-date because one or more objects in primary storage systems 103, 112, 123 and/or storage clusters 104, 114, 124 may be subsequently deleted, modified, or added.

To ensure that the searchable index is up-to-date within a threshold duration (e.g., 15 minutes), storage cluster 104, 114, 124 may be configured to provide the metadata associated with a plurality of objects stored in primary storage systems 103, 113, 123 and the metadata associated with a plurality of objects stored in storage clusters 104, 114, 124, respectively, according to an update policy. The update policy may indicate that a storage cluster is configured to provide to cloud service system 131 the metadata associated with a plurality of objects stored in the primary storage system and the metadata associated with a plurality of objects stored in the storage cluster on a periodic basis (e.g., every five minutes, every ten minutes, every fifteen minutes, etc.). The update policy may indicate that an incremental set of metadata is to be provided to cloud service system 131 after the initial set of metadata. Sending an incremental set of metadata instead of sending the full set of metadata may reduce the amount of bandwidth used to send the metadata to cloud service system 131 from the storage cluster. It may also reduce the overall amount of time to keep the searchable index up-to-date because cloud service system 131 may be processing less data to update the searchable index. The metadata to be included in the incremental set of metadata may be determined based on a timestamp associated with the metadata. In some embodiments, the update policy indicates that a storage cluster is configured to provide to cloud service system 131 the metadata associated with a plurality of objects stored in the primary storage system and the metadata associated with a plurality of objects stored in the storage cluster after a threshold amount of metadata has changed. In some embodiments, the update policy indicates that a storage cluster is configured to provide to cloud service system 131 the metadata associated with a plurality of objects stored in the primary storage system and the metadata associated with a plurality of objects stored in the storage cluster in response to a command from a user associated with the enterprise. In other embodiments, the update policy indicates that a storage cluster is configured to provide to cloud service system 131 the metadata associated with a plurality of objects stored in the primary storage system and/or the metadata associated with a plurality of objects stored in the storage cluster any time the metadata associated with a plurality of objects stored in the primary storage system or the metadata associated with a plurality of objects stored in the storage cluster has changed.

Cloud service system 131 may include UI service virtualization container 134. UI service virtualization container 134 may be configured to provide a user interface. The user interface may include a unified metadata search interface. A user associated with an enterprise may be able to use the unified metadata search interface associated with cloud service system 131 via user device 142 to perform a global search for any object in storage domains 101, 111, 121. User device 142 may be a computing device, such as a laptop, a desktop, a server, a smartphone, a cellular phone, a mobile device, a tablet, etc. User device 142 may include an application or a web browser capable of communicating with cloud service system 131 via connection 140. Connection 140 may be a wired or wireless connection.

Cloud service system 131 may search for the object using one or more metadata attributes associated with an object. The one or more metadata attributes associated with an object may include, but are not limited to, file name, network name, internet protocol (IP address), VM type, application type, application name, operating system (OS) name, OS type, date backed up, file size, location (e.g., which system stores the object), etc. UI service virtualization container 134 may, for example, receive from a user associated with an enterprise, a request for one or more objects with one or more metadata attributes (e.g., a particular file name). In response to the request, cloud service system 131 may determine the one or more objects associated with the one or more metadata attributes (e.g., particular filename) and provide via the user interface associated with UI service virtualization container 134 a notification of corresponding locations for the one or more determined objects associated with the one or more metadata attributes. In other embodiments, cloud service system 131 may forward the request to one or more registered storage clusters (e.g., storage clusters 104, 114, 124). In response to the request, a registered storage cluster may determine if there are any objects stored in the storage domain associated with the registered storage cluster that match the one or more metadata attributes associated with an object. The registered storage cluster may provide one or more search results to cloud service system 131, which in response, is configured to provide the one or more search results to user device 142 via a user interface provided by UI service virtualization container 134. Cloud service system 131 may not collect certain types of metadata, e.g., filename, from one or more registered storage clusters because the amount of data associated with the type of metadata is too voluminous. For example, an enterprise may be associated with a billion files. Cloud service system 131 may provide a unified metadata search interface for a plurality of enterprises. Storing the filename for a billion files per enterprise may require a large amount of cloud storage space. Cloud service system 131 may selectively determine the type of metadata that is provided from a registered storage cluster to cloud service system 131. In the event cloud service system 131 receives a requests for a metadata attribute that is not indexed by cloud service system 131, cloud service system 131 may forward the request to one or more registered storage clusters. This may reduce the amount of cloud storage space used by cloud service system 131, but increase the amount of time needed for cloud service system 131 to service the search request.

Previously, a user associated with the enterprise had to be physically on-premises at storage domains 101, 111, 121 to cause the one or more backup jobs associated with the one or more objects of storage domains 101, 111, 121 to be performed. However, cloud service system 131 may enable the user associated with the enterprise via user device 142 to remotely cause the one or more backup jobs associated with the one or more objects of storage domains 101, 111, 121 to be performed.

The user interface provided by UI service virtualization container 134 of cloud service system 131 may include a central storage management interface. UI service virtualization container 134 may receive via user device 142 an indication (e.g., a selection) of one of the storage clusters 104, 114, 124. In response to the indication, UI service virtualization container 134 may provide an indication of the one or more available backup jobs associated with the indicated storage cluster. The one or more available backup jobs may be different depending upon the indicated storage cluster because the storage clusters associated with an enterprise may have different backup capabilities. For example, storage cluster 104 may be associated with a first version of a storage cluster and storage cluster 114 may be associated with a second version of the storage cluster. The one or more available features associated with the first version of the storage cluster may be different than the one or more available features associated with the second version of the storage cluster. Storage cluster 114 may include the one or more available features associated with the storage cluster 104 and one or more available features not available with storage cluster 104, e.g., storage cluster 114 is an upgrade of storage cluster 104.

The central storage management interface associated with UI service virtualization container 134 may enable a user associated with the enterprise via user device 142 to remotely access any registered storage cluster associated with the enterprise (e.g., storage clusters 104, 114, 124). UI service virtualization container 134 may provide a native user interface version associated with an indicated storage cluster. For example, the native user interface may be provided to a web browser or application of user device 142. Each registered storage cluster may be associated with a different version of the storage cluster. Each version of the storage cluster may have a different native user interface. Providing a user interface that is different from the user interface of an indicated storage cluster may confuse the user associated with the enterprise. For example, the user may desire to perform a particular backup job. The on-premises storage cluster may provide a particular user interface that requires the user to interact with the particular user interface in a particular manner to cause the particular backup job to be performed. If the user interface provided by UI service virtualization container 134 is different than the user interface provided by the indicated storage cluster, then the user associated with the enterprise may waste time interacting with the user interface provided by UI service virtualization container 134 to figure out how to cause the particular backup job to be performed. In a worst case scenario, the user associated with the enterprise may give up and decide against performing the particular backup job because the user interface provided by UI service virtualization container 134 was too confusing.

UI service virtualization container 134 may be configured to provide the version of the native user interface associated with an indicated storage cluster. When a user associated with an enterprise registers a storage cluster with cloud service system 131, the storage cluster may provide configuration information associated with the storage cluster to cloud service system 131. The configuration information may include version information associated with the storage cluster. Cloud service system 131 may store a corresponding user interface code associated with each user interface version of the storage cluster.

UI service virtualization container 134 may provide a central storage management interface that displays a list of available storage clusters. UI service virtualization container 134 may receive an indication of a storage cluster from a user associated with an enterprise via user device 142. In response to the indicated storage cluster, UI service virtualization container 134 may determine a native user interface version associated with the indicated storage cluster and load the user interface code associated with the version of the native user interface of the indicated storage cluster. The native user interface may be accessed via a portion of the central storage management interface. This may enable the user associated with the enterprise to interact with the central storage management interface as if the user were local to the user interface of the indicated storage cluster. This may also reduce any user interface confusion the user may encounter.

A user associated with the enterprise may use the user interface associated with UI service virtualization container 134 via user device 142 to cause an indicated storage cluster to perform one or more backup commands. In response to receiving one or more commands, UI service virtualization container 134 may be configured to request from caching service virtualization container 136 an identifier associated with a persistent connection virtualization container corresponding to the indicated storage cluster. Caching service virtualization container 136 may respond to the request by inspecting (e.g., a lookup) a data structure stored by caching service virtualization container 136 to identify a persistent connection virtualization container associated with the indicated storage cluster (e.g., persistent connection virtualization container 133a, persistent connection virtualization container 133b, or persistent connection virtualization container 133c). For example, caching service virtualization container 136 may determine an IP address of a persistent connection virtualization container that is associated with the indicated storage cluster. Caching service virtualization container 136 may then provide UI service virtualization container 134 the identifier (e.g., IP address) associated with the persistent connection virtualization container corresponding to the indicated storage cluster. UI service virtualization container 134 may provide the one or more commands to the persistent connection virtualization container associated with the indicated storage cluster having the identifier. The persistent connection virtualization container associated with the indicated storage cluster (e.g., persistent connection virtualization container 133a, persistent connection virtualization container 133b, or persistent connection virtualization container 133c) may then forward the one or more commands to the indicated storage cluster (e.g., storage cluster 104, storage cluster 114, or storage cluster 124), which in response to receiving the one or more commands, is configured to perform one or more backup jobs based on the one or more commands.

In some embodiments, the plurality of virtualization containers associated with cloud service system 131 (e.g., UI service virtualization container 134, caching service virtualization container 136, search index virtualization container 138, ETL virtualization container 137, persistent connection virtualization containers 133a, 133b, 133c) are hosted on one of the storage clusters associated with an enterprise (e.g., storage cluster 104, storage cluster 114, storage cluster 124). The storage cluster hosting the plurality of virtualization containers may act as a master storage cluster for the enterprise. A user associated with the enterprise may register one or more other storage clusters with the master storage cluster. The master storage cluster may be configured to receive metadata associated with one or more other storage domains and provide the same services as cloud service system 131 (e.g., a user interface, a unified metadata search interface, a management interface). Management associated with the enterprise (e.g., a government agency, a financial institution, a law firm, etc.) may have concerns about storing enterprise data and enterprise information in a cloud environment using cloud service system 131. The enterprise data and enterprise information may be stored using a master storage cluster instead of cloud service system 131. The master storage cluster may provide the same functionality as described herein as cloud service system 131.

Figure 2:
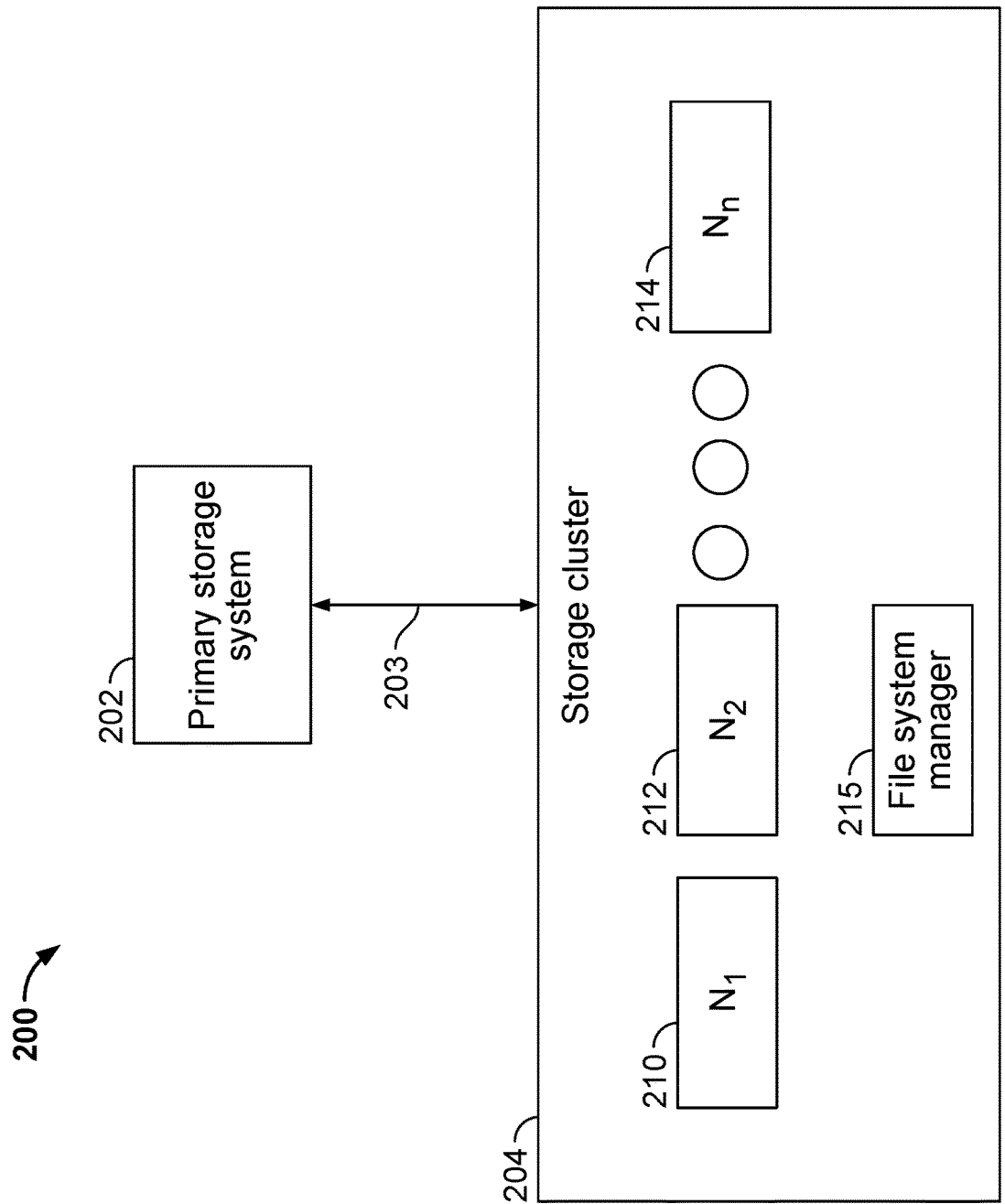
FIG. 2 is a diagram illustrating an embodiment of a storage domain.

FIG. 2 is a diagram of illustrating an embodiment of a storage domain. In the example shown, storage domain 200 includes primary storage system 202 and storage cluster 204 connected via network 203. Storage domain 200 may be implemented in at least one of the storage domains 101, 111, 121 of FIG. 1.

Primary storage system 202 is a computing system that stores file system data. Primary storage system 202 may be comprised of one or more servers, one or more computing devices, one or more storage devices, and/or a combination thereof. In response to one or more commands received from storage cluster 204, primary storage system 202 may perform a backup snapshot of the one or more storage volumes of primary storage system 202 to storage cluster 204.

The backup snapshot may be a full backup snapshot or an incremental backup snapshot. Each storage volume of the primary storage system is comprised of file system data. File system data may be comprised of a plurality of objects. A full backup snapshot includes a copy of the entire file system data of the storage volume to be backed up. An incremental backup snapshot stores the file system data that was not previously backed up.

Primary storage system 202 may be configured to backup file system data to storage cluster 204 according to one or more backup policies associated with storage cluster 204. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has changed. In other embodiments, a backup policy indicates that file system data is to be backed up upon a command from a user associated with primary storage system 202. For example, a user associated with primary storage system 202 may cause a backup snapshot to be performed via a cloud service system. The file system data may be sent from primary storage system 202 to storage cluster 204 via a network 203. Network 203 may be one or more of the following: a local area network, a wide area network, a wired network, a wireless network, the Internet, an intranet, or any other appropriate communication network.

Storage cluster 204 is configured to receive and backup file system data from primary storage system 202. Storage cluster 204 is configured to store the file system data and organize the file system data in a tree data structure. An example of the tree data structure is a snapshot tree (e.g., Cohesity Snaptree), which may be based on a B+ tree structure (or other type of tree structure in other embodiments). The file system data may include metadata associated with the file system data, a plurality of content files, and metadata associated with the content files. The storage cluster may create a file system metadata snapshot tree for the backup snapshot. The metadata associated with the plurality of content files may be organized using a snapshot tree and stored in a key value store (KVS). The file system metadata snapshot tree for the backup snapshot corresponds to a version of the storage volume(s) at a particular moment in time. The storage cluster may also create a file tree corresponding to a content file included in the backup snapshot. The file tree is a file metadata structure. The file tree may store the metadata associated with the file corresponding to the file tree. A leaf node of the file system metadata snapshot tree may include a pointer to one of the file trees, linking the contents of a content file to the file system metadata snapshot tree. A leaf node of a file tree may include a pointer to a brick storing one or more data chunks associated with a content file. A leaf node of the snapshot tree may be configured to store a key-value pair of metadata.

The key-value pairs of metadata (e.g., log sequence numbers, file name, creation date, offline/online status, etc.) may be stored in the KVS.

A file system metadata snapshot tree is a tree data structure and is comprised of a root node, one or more levels of intermediate nodes, and one or more leaf nodes. In some embodiments, a file system metadata snapshot tree is comprised of a root node and one or more leaf nodes. The root node is the starting point of a file system metadata snapshot tree and may include pointers to one or more other nodes. The root node includes an identifier that indicates a view (e.g., backup snapshot) with which the root node is associated. An intermediate node is a node to which another node points (e.g., root node, other intermediate node) and includes one or more pointers to other nodes. A leaf node is a node at the bottom of a file system metadata snapshot tree. In some embodiments, a leaf node is configured to store key-value pairs of file system metadata associated with the storage volume(s). In some embodiments, a leaf node includes a pointer to a file tree. For example, a leaf node of a file system metadata snapshot tree storing metadata associated with the storage volume(s) may include a pointer to a root node of a file tree storing data associated with a content file. In some embodiments, a leaf node of a file system metadata snapshot tree or a leaf node of a file tree includes a pointer to or an identifier of a brick identifier associated with one or more data chunks of the file. A data brick may be associated with one or more chunk identifiers (e.g., SHA-1). A chunk metadata table may store information that associates a brick identifier with one or more chunk identifiers and one or more chunk file identifiers. A chunk file metadata table may associate a chunk file identifier with a chunk file storing a plurality of data chunks. The chunk metadata table and the chunk file metadata table may be used, based on a brick identifier, to locate the data chunks associated with the file corresponding to the file metadata tree.

The tree data structure may be used to capture different versions of the storage volume(s) at different moments in time. A backup snapshot received from a primary storage system may include data associated with a first version of the storage volume(s) at a first point in time and a subsequent backup snapshot received from the primary storage system may include data associated with the second version of the storage volume(s) at a second point in time. Each version of the volume(s) may be represented in a corresponding file system metadata snapshot tree. The tree data structure allows a chain of file system metadata snapshot trees (i.e., each corresponding file system metadata snapshot tree) to be linked together by allowing a node of a later version of a file system metadata snapshot tree corresponding to a later version of the storage volume(s) to reference a node of a previous version of the file system metadata snapshot tree corresponding to an earlier version of the storage volume(s). The tree data structure allows a chain of file trees (i.e., each corresponding file tree) to be linked together by allowing a node of a later version of a file tree corresponding to a later version of a content file to reference a node of a previous version of the file tree corresponding to an earlier version of the content file.

Each time data for an incremental backup snapshot of the storage volume(s) is received, a new file system metadata snapshot tree is added to the corresponding tree data structure by creating a new root node. The new root node may be a clone of the root node associated with a previous file system metadata snapshot tree. Initially upon creation, the new root node includes the set of pointers included in the previous root node, that is, the new root node includes one or more pointers to an intermediate node or leaf node that was specified in the root node of a previous file system metadata snapshot tree associated with a previous backup. However, among other differences, the new root node includes a node identifier and a view identifier that is different than the node identifier and view identifier of the previous root node. The new file system metadata snapshot tree may be modified to reflect the data included in the backup of the storage volume(s) (e.g., adding one or more intermediate nodes, adding one or more leaf nodes, updating pointers associated with nodes).

A file system metadata snapshot tree is a representation of a fully hydrated backup because it provides a complete view of the storage volume(s) at a particular moment in time. A fully hydrated backup is a backup that is ready for use without having to reconstruct a plurality of backups to use it. Previous systems may reconstruct a backup by starting with a full backup and applying one or more changes associated with one or more incremental backups to the data associated with the full backup. In contrast, any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. For example, a root node associated with the file system metadata snapshot tree may include one or more references to leaf nodes associated with one or more previous backup snapshots and one or more references to leaf nodes associated with the current backup snapshot. This provides significant savings in the amount of time needed to restore or recover a storage volume and/or a database. In contrast, traditional recovery/ restoration methods may require significant time, storage, and computational resources to reconstruct a particular version of a volume or database from a full backup and a series of incremental backups.

Storage cluster 204 may be comprised of one or more solid state drives, one or more hard disk drives, or a combination thereof. Storage cluster 204 may include file system manager 215. File system manager 215 is configured to maintain file system data in the form of nodes arranged in a tree data structure. In some embodiments, leaf nodes in the file system tree include key-value pairs that associate data keys with values in the form of particular items of file system data. File system manager 215 may be configured to perform one or more modifications to a snapshot tree. File system data may include data associated with one or more content files and metadata associated with the one or more content files. The metadata may include information, such as file size, directory structure, file permissions, physical storage location of the content files, time of last access, time of last modification, etc. The metadata values for the one or more content files may be stored in a metadata store, such as a KVS.

The storage cluster 204 includes a first storage node 210, a second storage node 212, and an nth storage node 214. In some embodiments, n is an odd number. Each storage node may include a corresponding disk storage, a corresponding KVS, a corresponding processor, and a corresponding memory. A user associated with storage cluster 204 may log into one of the storage nodes 210, 212, 214 and enable a process to register storage cluster 204.

Each storage node 210, 212, 214 maintains a portion of the KVS. The key-value pairs of the KVS may be grouped into a plurality of buckets. Each node of the plurality of storage nodes includes a local KVS that stores a portion of the KVS, i.e., at least one of the plurality of buckets. Keys may be assigned to a storage node using a hashing function that generally distributes keys equally across the nodes. A master node of the plurality of storage nodes may be configured to store a master table. The master table may match a key-value pair to a storage node. Storage cluster 204 may receive a file operation (e.g., write/read operation). The master node may inspect the master table and direct the file operation to the storage node associated with the file operation, i.e., the node that will handle the file operation.

At least one storage node in storage cluster 204 may be designated as a backup node for the portion of the KVS that is stored on another storage node of the storage cluster 204. For example first storage node 210 may store keys $k_{11}$ to $k_{1n}$. At least one copy of keys $k_{11}$ to $k_{1n}$ may be stored on the second storage node 212, the nth storage node 214, or any of the storage nodes between the second storage node 212 and the nth storage node 214. This provides fault tolerance and consistency for the distributed computing system in the event of a node failure. Multiple copies of keys may be stored across multiple storage nodes to increase the fault tolerance of the distributed computing system. In some embodiments, each key of the KVS is stored across a majority of the storage nodes.

Figure 3:
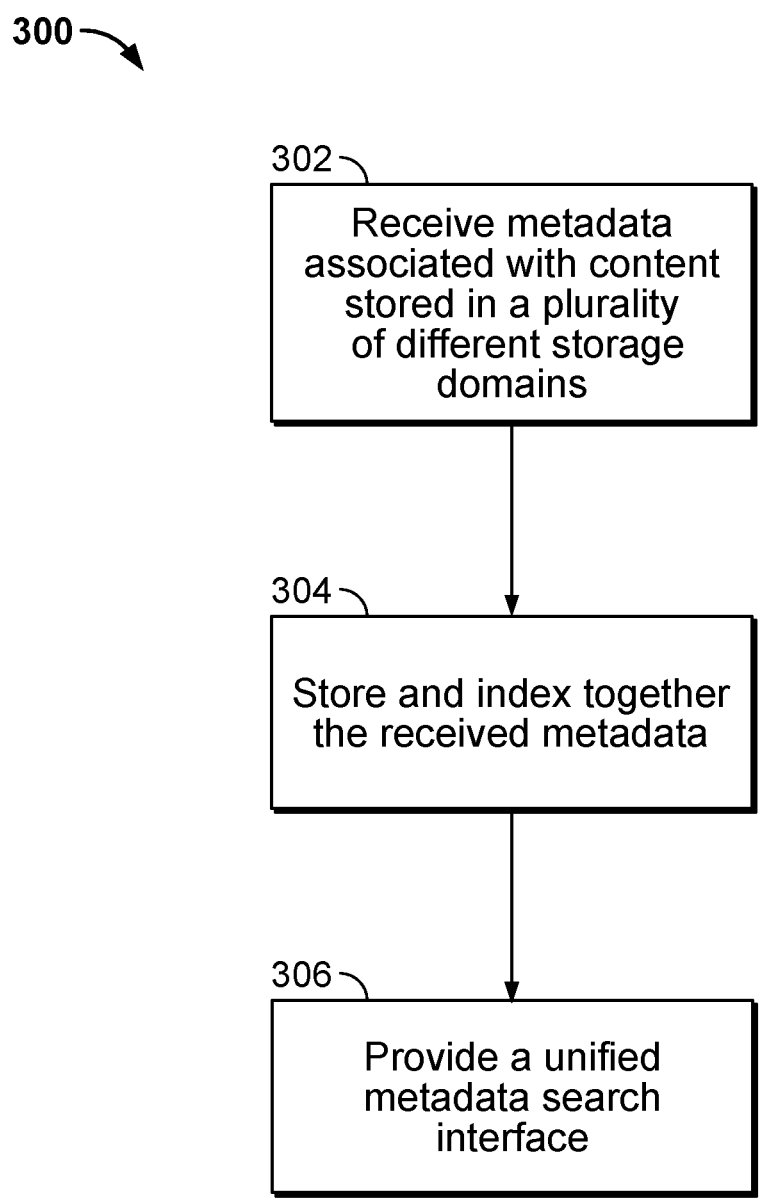
FIG. 3 is a flow chart illustrating a process for providing a unified metadata search interface in accordance with some embodiments.

FIG. 3 is a flow chart illustrating a process for providing a unified metadata search interface in accordance with some embodiments. In the example shown, process 300 may be implemented by a cloud service system, such as cloud service system 131.

At 302, metadata associated with content stored in a plurality of different storage domains is received. An enterprise may be associated with a plurality of storage domains located at different locations. Each storage domain may have an associated storage cluster. A user associated with the enterprise may register one or more storage clusters associated with the enterprise.

A storage domain may be comprised of a primary storage system and a storage cluster. Each storage cluster may have a metadata store that indicates the one or more objects stored by the storage cluster. Each storage cluster may have access to a corresponding primary storage system and determine the one or more objects stored by the storage cluster.

In some embodiments, each of the registered storage clusters provide all of the metadata associated with the content stored in the primary storage system and all of the metadata associated with the content stored in the registered storage cluster.

In other embodiments, each of the registered storage clusters provide the metadata associated with content stored in the primary storage system that has not been provided to a cloud service system and the metadata associated with content stored in the registered storage cluster that has not been provided to the cloud service system.

At 304, the received metadata is stored and indexed together. In response to receiving from one or more registered storage clusters the metadata associated with a plurality of objects, the cloud service system may perform an ETL process and consolidate a result of the ETL process in a global index.

At 306, a unified metadata search interface is provided. A UI service virtualization container may provide a user interface that includes the unified metadata search interface. The unified metadata search interface may enable a user associated with the enterprise to perform a global search for any object stored in the plurality of different storage domains. A user associated with the enterprise may use one or more metadata attributes to search for any of the objects in the one or more storage domains associated with the enterprise.

The cloud service system may generate a searchable index based on the metadata, however, the searchable index may become out-of-date because one or more objects in the primary storage system and/or the storage cluster may be subsequently deleted, modified, or added. To ensure that the searchable index is up-to-date within a threshold duration (e.g., 15 minutes), the storage cluster may be configured to provide the metadata associated with a plurality of objects stored in the primary storage system and the metadata associated with a plurality of objects stored in the storage cluster according to an update policy.

The update policy may indicate that a storage cluster is configured to provide to the cloud service system the metadata associated with a plurality of objects stored in the primary storage system and the metadata associated with a plurality of objects stored in the storage cluster on a periodic basis (e.g., every five minutes, every ten minutes, every fifteen minutes, etc.). The update policy may indicate that an incremental set of metadata is to be provided to the cloud service system after the initial set of metadata. The storage cluster may reduce the amount of bandwidth used to send the metadata to the cloud service system from the storage cluster by sending an incremental set of metadata instead of sending the full set of metadata. Sending an incremental set of metadata may also reduce the overall amount of time to keep the searchable index up-to-date because the cloud storage system may be processing less data to update the searchable index. The metadata to be included in the incremental set of metadata may be determined based on a timestamp associated with the metadata. For example, the storage cluster may provide the metadata for objects having a timestamp later than a timestamp associated with a last update. In some embodiments, the update policy indicates that a storage cluster is configured to provide to the cloud service system the metadata associated with a plurality of objects stored in the primary storage system and the metadata associated with a plurality of objects stored in the storage cluster after a threshold amount of metadata has changed. In some embodiments, the update policy indicates that a storage cluster is configured to provide to the cloud service system the metadata associated with a plurality of objects stored in the primary storage system and the metadata associated with a plurality of objects stored in the storage cluster in response to a command from a user associated with the enterprise. In other embodiments, the update policy indicates that a storage cluster is configured to provide to the cloud service system the metadata associated with a plurality of objects stored in the primary storage system and/or the metadata associated with a plurality of objects stored in the storage cluster any time the metadata associated with a plurality of objects stored in the primary storage system or the metadata associated with a plurality of objects stored in the storage cluster has changed.

Figure 4:
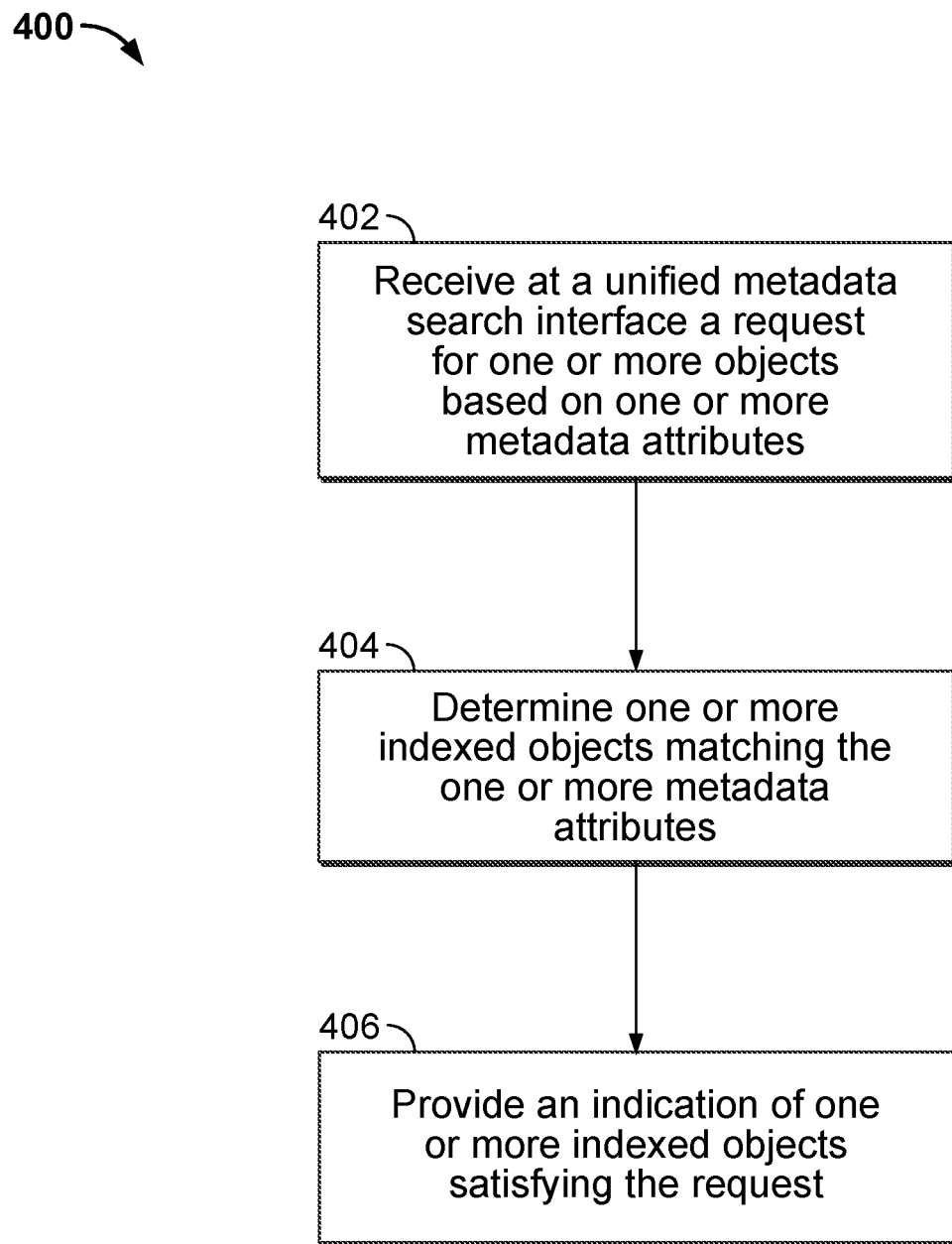
FIG. 4 is a flow chart illustrating a process for performing a search using a unified metadata search interface in accordance with some embodiments.

FIG. 4 is a flow chart illustrating a process for performing a search using a unified metadata search interface in accordance with some embodiments. In the example shown, process 400 may be implemented by a cloud service system, such as cloud service system 131. In some embodiments, process 400 is implemented to perform some or all of step 306 of process 300.

At 402, a request for one or more objects based on one or more metadata attributes is received at a unified metadata search interface. A cloud service system may store in an index metadata associated with a plurality objects stored in one or more storage domains. The cloud service system may include a UI service virtualization container that is configured to provide a user interface. The user interface may include the unified metadata search interface. A user interacting with the unified metadata search interface may provide a request for one or more objects based on one or more metadata attributes. The one or more metadata attributes associated with an object may include, but are not limited to, file name, network name, internet protocol (IP address), VM type, application type, application name, operating system (OS) name, OS type, date backed up, file size, location (e.g., which system stores the object), etc.

At 404, one or more indexed objects matching the one or more metadata attributes are determined. The cloud service system may use the index to determine the one or more objects matching the one or more metadata attributes. The index may be up-to-date within a threshold duration (e.g., up-to-date since a last update). The cloud service system may be able to determine a corresponding storage domain associated with the one or more objects matching the one or more metadata attributes. The cloud service system may also be able to determine a location within the corresponding storage domain associated with the one or more objects matching the one or more metadata attributes, i.e., whether an object is stored in a primary storage system of the corresponding storage domain or a storage cluster of the corresponding storage domain.

At 406, an indication of the one or more indexed objects satisfying the request is provided. The cloud service system may provide via the unified metadata search interface a list of the one or more indexed objects satisfying the request. In addition to the one or more requested metadata attributes, the list may also include one or more other metadata attributes associated with the one or more objects matching the requested one or more metadata attributes. The indication may include a corresponding location associated with the one or more indexed objects satisfying the request. The corresponding location may include a storage domain of the different storage domains, a primary storage system of the storage domain, or a storage cluster of the storage domain.

Figure 5:
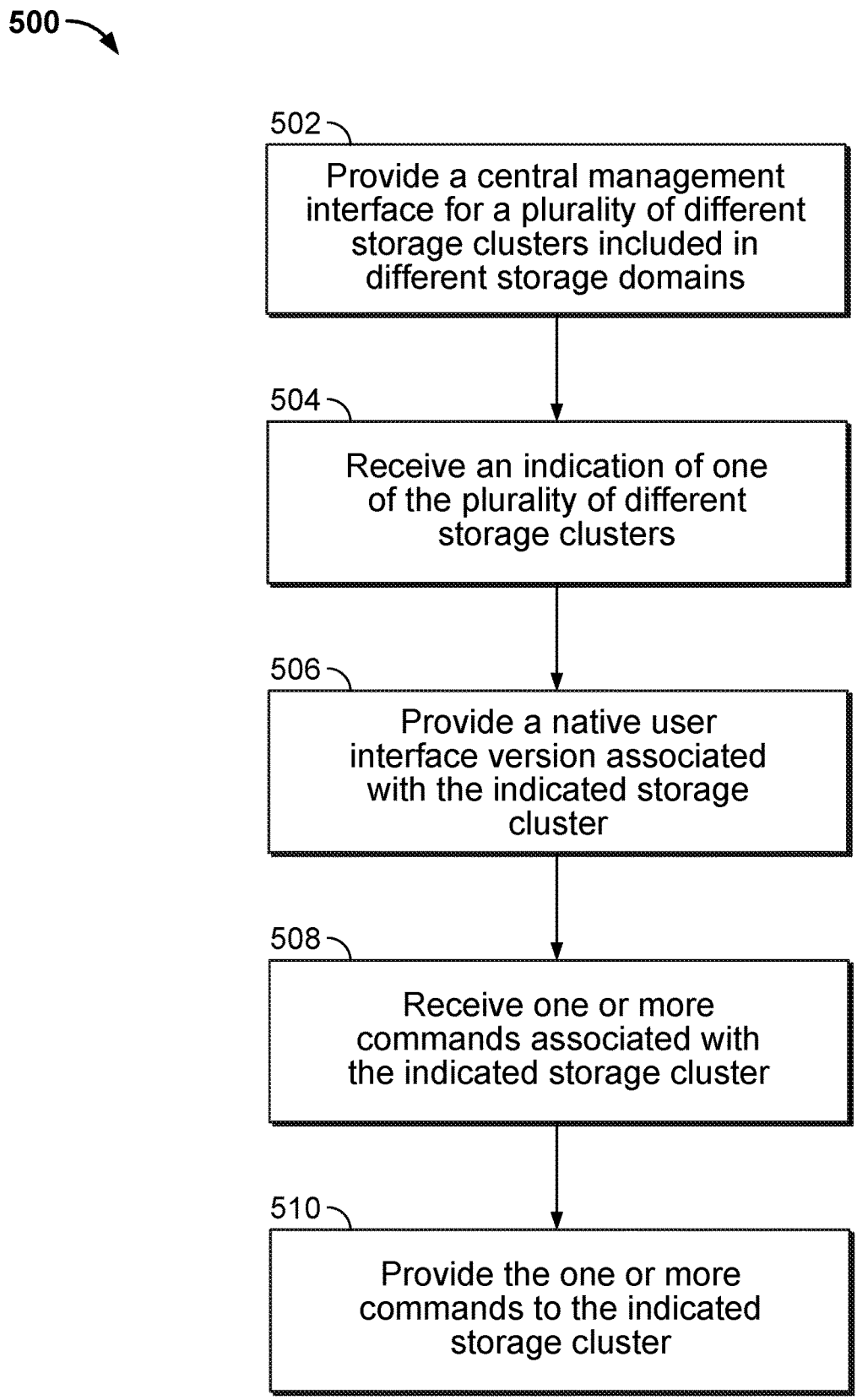
FIG. 5 is a flow chart illustrating a process for performing a backup job in accordance with some embodiments.

FIG. 5 is a flow chart illustrating a process for performing a backup job in accordance with some embodiments. In the example shown, process 500 may be implemented by a cloud service system, such as cloud service system 131.

At 502, a central storage management interface for a plurality of different storage clusters included in different storage domains is provided. A cloud service system may include a UI service virtualization container that is configured to provide a user interface that includes a central storage management interface. The central storage management interface may include an overview screen that displays a list of registered storage clusters associated with a user. The overview screen may provide information associated with each of the available storage clusters. For example, the information associated with an available storage cluster may include deduplication statistics associated with the storage cluster (e.g., amount of data that is deduped, ratio of deduped data to non-deduped data, etc.), the last time a backup snapshot was performed by the storage cluster, a list of the most recent backup jobs performed, the available amount of storage associated with the storage cluster, the amount of available processing resources associated with the storage cluster, a protection policy associated with the storage cluster (e.g., gold, silver, bronze, etc.), and/or whether the storage cluster is online or offline.

A protection policy may indicate a set of available features associated with the storage cluster. A gold policy may indicate that all of the features associated with the storage cluster are available. A silver policy may indicate that a first subset of the features associated with the storage cluster are available. A bronze policy may indicate that a second subset of the features associated with the storage cluster are available where the second subset of features is smaller than the first subset of features.

In some embodiments, the list of registered storage clusters includes all of the registered storage clusters associated with an enterprise. In other embodiments, the list of registered storage clusters includes all of the registered storage clusters associated with a particular userID.

At 504, an indication of one of the plurality of different storage clusters is received. The UI service virtualization container of the cloud service system may receive a selection of one of the registered storage clusters from a user associated with an enterprise.

At 506, a native user interface version associated with the indicated storage cluster is provided. In response to the indication, the UI service virtualization container may determine a version of a native user interface associated with the indicated storage cluster and load the user interface code associated with the native user interface version of the indicated storage cluster. The native user interface may be accessed via a portion of the central storage management interface (e.g., inline frame). This may enable the user associated with the enterprise to interact with the central storage management interface associated with the UI service virtualization container as if the user were local to the user interface of the indicated storage cluster.

The one or more available protection jobs associated with the indicated storage cluster may be filtered based on the protection policy associated with the indicated storage cluster. The one or more available protection jobs associated with the indicated storage cluster may be filtered based on whether the primary storage system associated with the indicated storage cluster is available or the indicated storage cluster is available.

At 508, one or more commands associated with the indicated storage cluster are received. A user associated with the enterprise may use the central storage management interface to cause the indicated storage cluster to perform one or more backup commands. In some embodiments, the one or more backup commands cause one or more objects associated with a primary storage system associated with the indicated storage cluster to be backed up to the indicated storage cluster. In other embodiments, the one or more backup commands cause one or more objects associated with a primary storage system associated with the indicated storage cluster to be backed up to one of the other registered storage clusters. In some embodiments, the one or more backup commands cause the primary storage system associated with the indicated storage cluster to perform a backup snapshot (full or incremental) to the indicated storage cluster. In some embodiments, the one or more backup commands cause the primary storage system associated with the indicated storage cluster to perform a backup snapshot (full or incremental) to one of the other registered storage clusters. In some embodiments, the one or more backup commands cause the indicated storage cluster to restore one or more objects stored on the indicated storage cluster to the primary storage system associated with the indicated storage cluster. In some embodiments, the one or more backup commands cause the indicated storage cluster to restore one or more objects stored on the indicated storage cluster to a primary storage system associated with one of the primary storage systems associated with one of the other registered storage clusters. In some embodiments, the one or more backup commands cause the indicated storage cluster to archive one or more objects stored on the indicated storage cluster to a cloud archive. In some embodiments, the one or more backup commands cause the indicated storage cluster to retrieve one or more objects stored in the cloud archive to the indicated storage cluster.

At 510, the one or more commands are provided to the indicated storage cluster. In response to receiving the one or more commands, the UI service virtualization container may be configured to request from a caching service virtualization container of the cloud service system an identifier associated with a persistent connection virtualization container corresponding to the indicated storage cluster. A caching service virtualization container may respond to the request by inspecting (e.g., a lookup) a data structure stored by caching service virtualization container to identify a persistent connection virtualization container associated with the indicated storage cluster. For example, the caching service virtualization container may determine an IP address of a persistent connection virtualization container that is associated with the indicated storage cluster. The caching service virtualization container may then provide the UI service virtualization container the identifier (e.g., IP address) associated with the persistent connection virtualization container corresponding to the indicated storage cluster. The UI service virtualization container may provide the one or more commands to the persistent connection virtualization container associated with the indicated storage cluster having the identifier. The persistent connection virtualization container associated with the indicated storage cluster may then forward the one or more commands to the indicated storage cluster, which in response to receiving the one or more commands, is configured to perform one or more backup jobs based on the one or more commands.

Figure 6:
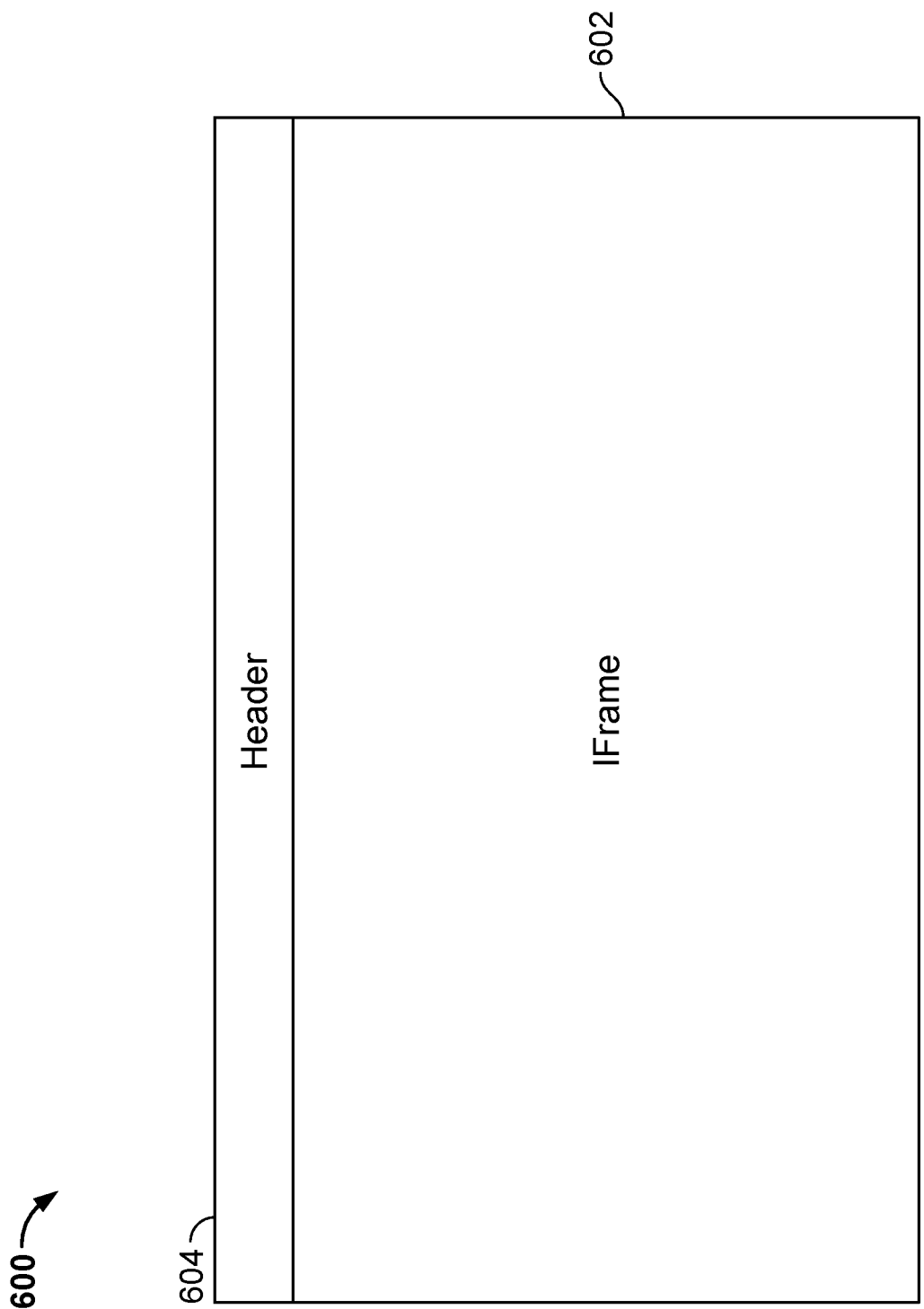
FIG. 6 is a block diagram illustrating a central storage management interface in accordance with some embodiments.

FIG. 6 is a block diagram illustrating a central storage management interface in accordance with some embodiments. In the example shown, central storage management interface 600 may be provided by a UI service virtualization container, such as UI service virtualization container 134.

A UI service virtualization container may be configured to provide central storage management interface 600. Central storage management interface 600 may provide an overview screen (not shown) that displays a list of available storage clusters. The UI service virtualization container may receive an indication of a storage cluster via central storage management interface.

In response to the selection, the UI service virtualization container may determine a version of a native user interface associated with the indicated storage cluster by inspecting a data structure that stores configuration information associated with a plurality of registered storage clusters. The configuration information may include the native user interface version associated with a registered storage cluster. The native user interface version associated with the registered secondary storage may be associated with a particular user interface code. A cloud service system associated with the UI service virtualization container may store a copy of the user interface code corresponding to different native user interface versions of a storage cluster.

The UI service virtualization container may load the user interface code associated with the indicated storage cluster. The native user interface may be accessed via portion 602 of central storage management interface 600. The first portion 602 of central storage management interface 600 may be an inline frame (iframe). The second portion 604 of user interface 600 may be a header that is displayed regardless of which storage cluster is indicated. In some embodiments, a name of the indicated storage cluster is displayed in the second portion 604.

Figure 7:
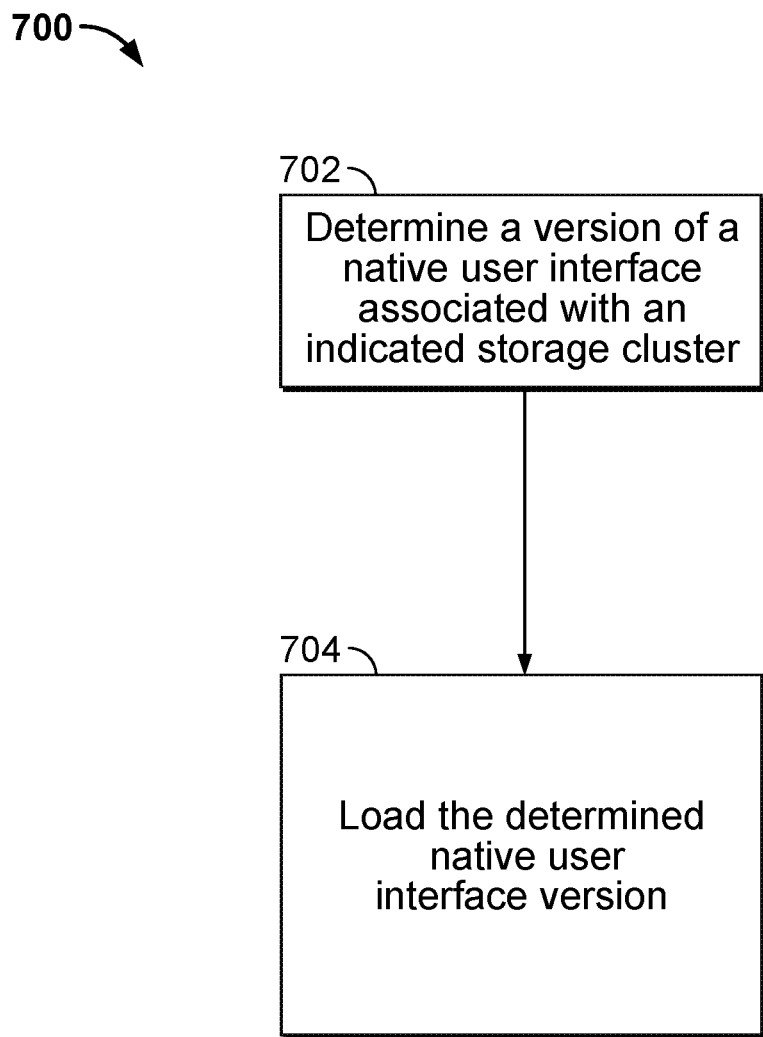
FIG. 7 is a flow chart illustrating a process for providing a user interface in accordance with some embodiments.

FIG. 7 is a flow chart illustrating a process for providing a user interface in accordance with some embodiments. In the example shown, process 700 may be implemented by a UI service virtualization container, such as UI service virtualization container 134. Process 700 may be implemented to perform some or all of step 506 of process 500.

At 702, a version of a native user interface associated with an indicated storage cluster is determined. A UI service virtualization container of a cloud service system may be configured to provide a user interface that includes a central storage management interface. The central storage management interface may provide an overview screen and display a list of available storage clusters. The UI service virtualization container may receive an indication of a storage cluster via the central storage management interface.

Each of the storage clusters may be registered by a user. During a cluster registration procedure, a storage cluster may provide configuration information to the cloud service system. The configuration information may indicate a version of a native user interface associated with the storage cluster. Each native user interface version is associated with a particular user interface code. The cloud service system may store a data structure that associates a storage cluster with a native user interface version, and a particular user interface code. The cloud service system may be configured to store a copy of the user interface code associated with the different native user interface versions. The cloud service system may inspect the data structure to determine the version of the native user interface associated with the indicated storage cluster.

At 704, the native user interface version is loaded. The native user interface version may be loaded to provide a remote native management interface of the indicated storage cluster within a user interface context of the central storage management interface. User interface code associated with the determined native user interface version of the indicated storage cluster is loaded and the native user interface may be accessed via a portion of the central storage management interface. The central storage management interface may include an iframe. The user interface code associated with the determined native user interface version of the indicated storage cluster may be accessed via the iframe. This may enable the user to interact with the central storage management interface associated with the cloud service system as if the user were local to the user interface of the indicated storage cluster. This may also reduce any user interface confusion the user may encounter.

Figure 8:
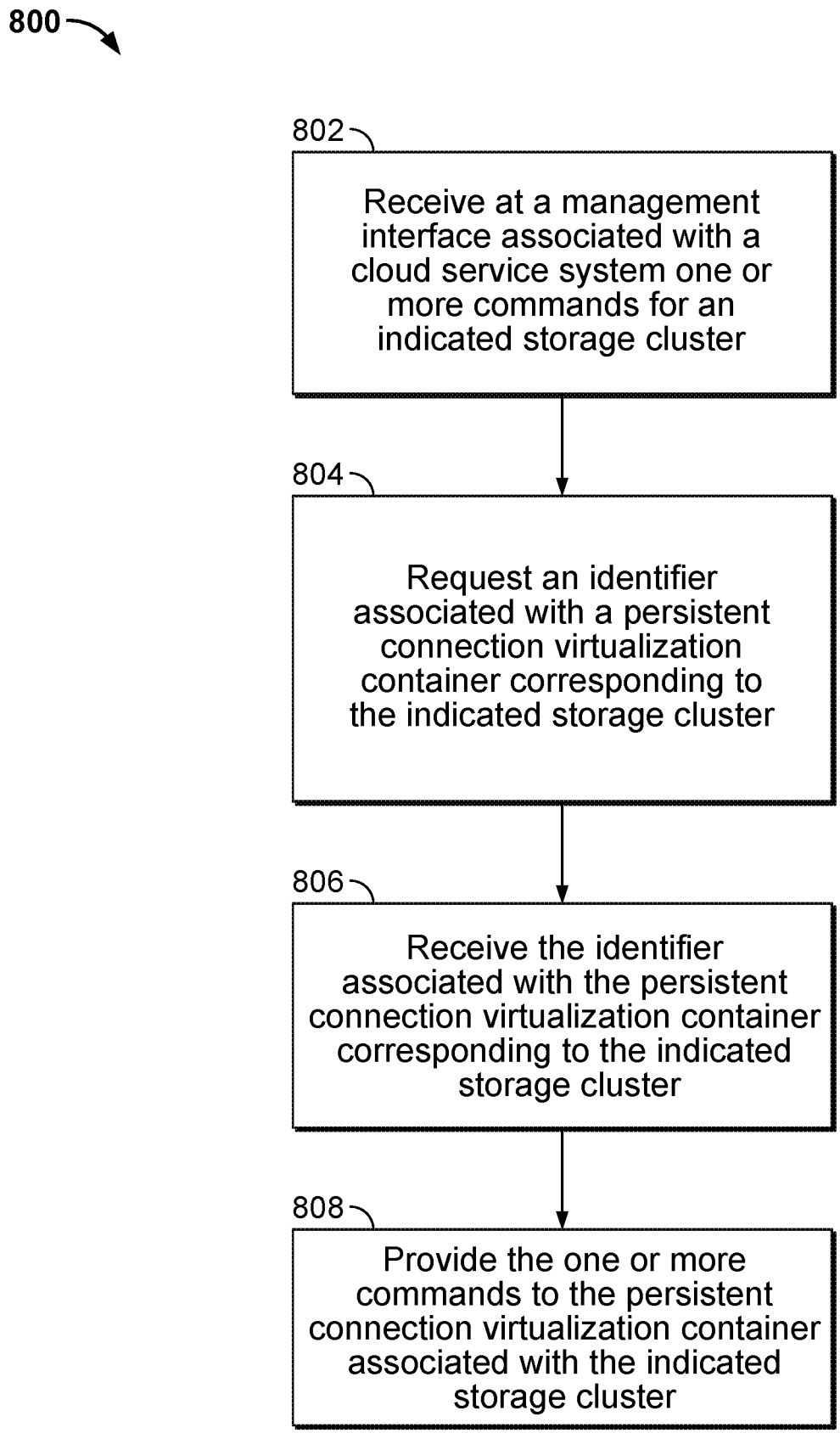
FIG. 8 is a flow chart illustrating a process for performing a backup job in accordance with some embodiments.

FIG. 8 is a flow chart illustrating a process for performing a backup job in accordance with some embodiments. In the example shown, process 800 may be implemented by a cloud service system, such as cloud service system 131. Process 800 may be implemented to perform some or all of 510 of process 500.

At 802, one or more commands for an indicated storage cluster are received at a central storage management interface associated with a cloud service system. An indicated storage cluster may have an associated identifier. When the indicated storage cluster is registered with the cloud service system, the cloud service system may store a data structure that associates the storage cluster with a storage cluster identifier, a persistent connection virtualization container, and configuration information associated with the storage cluster identifier. The configuration information may indicate a version of a native user interface associated with the storage cluster.

A UI service virtualization container may provide a user interface to the user device. The user interface may be a unified management interface for all of the storage clusters to which a user is associated. The unified management interface may enable the user to remotely access and manage storage clusters that are physically located separately throughout the world from a single location. The unified management interface may be comprised of a unified metadata search interface and a central storage management interface. For example, the user may use the unified metadata search interface to search for any object stored in one or more storage domains. The user may use the central storage management interface to send one or more commands to at least one of the storage clusters via the user interface provided by the UI service virtualization container. For example, a user associated with the storage cluster may at any time request via the central storage management interface associated with the cloud service system, for the storage cluster of the storage domain to perform a backup snapshot of the file system data associated with the primary storage system of the storage domain.

The UI service virtualization container does not know which persistent connection virtualization container of the plurality of persistent connection virtualization containers is to receive the one or more commands because it does not store such information.

At 804, an identifier associated with a persistent connection virtualization container corresponding to the indicated storage cluster is requested. The UI service virtualization container may provide a storage cluster identifier associated with the indicated storage cluster to a caching service virtualization container. The caching service virtualization container may respond to the request by inspecting a data structure stored by the caching service virtualization container to identify a persistent connection virtualization container associated with the specified storage cluster identifier. The caching service virtualization container may respond to the request by providing the UI service virtualization container the identifier (e.g., IP address) associated with the persistent connection virtualization container corresponding to the indicated storage cluster.

At 806, the identifier associated with a persistent connection virtualization container corresponding to the indicated storage cluster is received.

At 808, the one or more commands are provided to the persistent connection virtualization container associated with the indicated storage cluster. The one or more commands are provided to the persistent connection virtualization container having the identifier received from the caching service virtualization container. In response to receiving the one or more commands, the persistent connection virtualization container is configured to provide the one or more commands to the indicated storage cluster. In response to receiving the one or more commands, the indicated storage cluster is configured to perform one or more secondary storage functions (e.g., a backup, a restore, etc.) based on the one or more commands.

Figure 9:
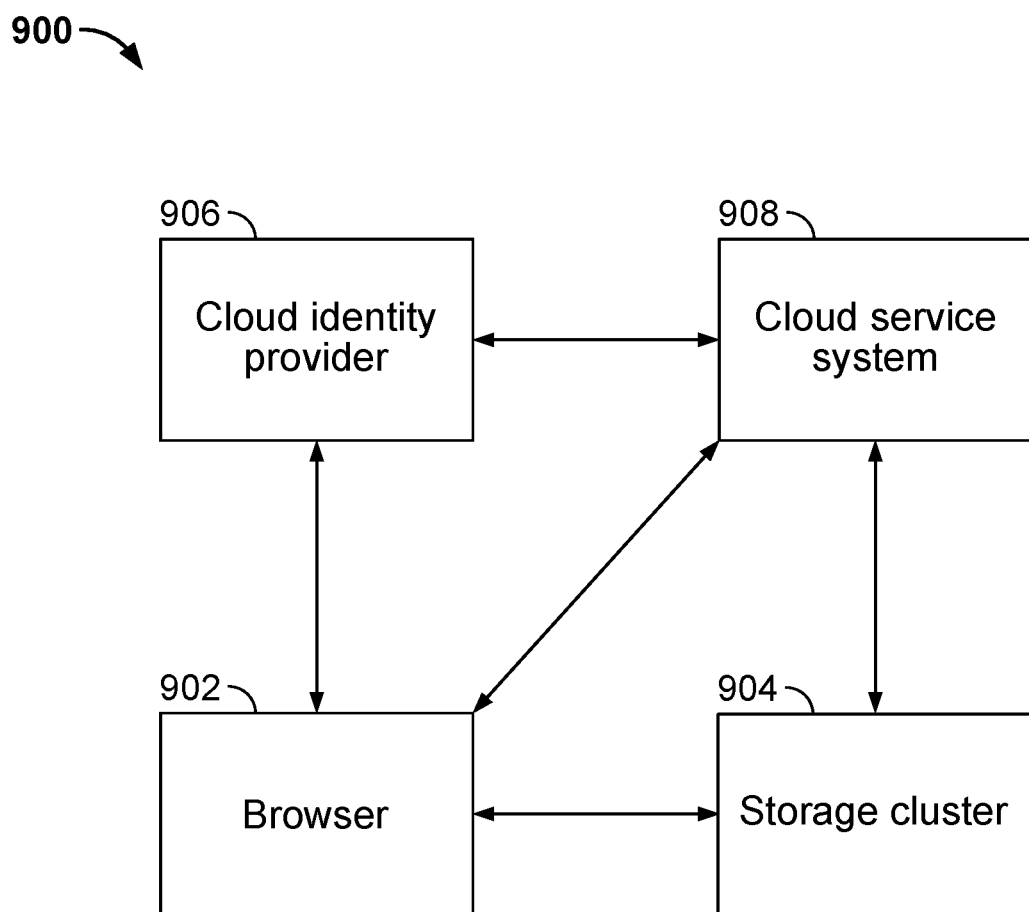
FIG. 9 is a diagram illustrating a system for registering a storage cluster in accordance with some embodiments.

FIG. 9 is a diagram illustrating a system for registering a storage cluster in accordance with some embodiments. In the example shown, system 900 includes browser 902, storage cluster 904, cloud identity provider 906, and cloud service system 908. Storage cluster 904 may be implemented by a storage cluster, such as storage cluster 104, 114, 124, 204. Cloud service system 908 may be implemented by a cloud service system, such as cloud service system 131.

Browser 902 is associated with a user device. The user device may be a computer, a laptop, a desktop, a server, a mobile device, a smartphone, a cellular phone, a smart watch, a tablet, a personal data assistant, or any other electronic device capable of running a web browser. Browser 902 may be any web browser capable of browsing the Internet (e.g., Microsoft Internet Explorer, Google Chrome, Mozilla Firefox, Apple Safari, etc.). Browser 902 may enable a user associated with storage cluster 904 to remotely access and manage storage cluster 904.

Storage cluster 904 may be part of a storage domain that is comprised of a primary system and a storage cluster. The primary system may be comprised of an object, virtual machine, physical entity, file system, array backup, and/or volume that stores file system data. Storage cluster 904 may cause the primary system to perform a backup snapshot according to a backup policy and to store the backup snapshot to storage cluster 904. A backup snapshot represents the state of the primary system at a particular point in time (e.g., the state of the file system data). The backup policy may require a full backup snapshot and/or an incremental backup snapshot to be performed. A full backup snapshot stores the entire state of the primary system at a particular point in time. The file system data is comprised of a plurality of data blocks. The primary system may include a change block tracker that monitors and identifies one or more data blocks of the primary system that have changed (e.g., modified, deleted, added) since the last backup snapshot. An incremental backup snapshot includes the one or more data blocks that have changed since the last backup snapshot.

A user associated with storage cluster 904 may be permitted to access and manage the one or more backup snapshots stored in storage cluster 904. For example, a user associated with storage cluster 904 may be permitted to restore the primary system to a state associated with one of the backup snapshots stored in storage cluster 904. A user associated with storage cluster 904 may be permitted to restore to the primary system a file associated with one of the backup snapshots stored in storage cluster 904. A user associated with the storage cluster 904 may be permitted to cause the primary system associated with storage cluster 904 to perform a backup snapshot. A user associated with storage cluster 904 may delete one of the backup snapshots that is stored on storage cluster 904.

In some embodiments, the user associated with storage cluster 904 is associated with a second storage cluster. The user associated with storage cluster 904 may be permitted to restore the primary system associated with the storage cluster using one of the backup snapshots stored in storage cluster 904. The user associated with storage cluster 904 may be permitted to restore the primary system associated with storage cluster 904 using one of the backup snapshots associated with the storage cluster.

A user associated with storage cluster 904 may remotely access and manage storage cluster 904. For example, a user associated with storage cluster 904 may remotely log into storage cluster 904 via a VPN connection. However, the user associated with storage cluster 904 may be associated with a plurality of storage clusters. For example, an enterprise may have storage domains that include corresponding storage clusters located throughout the world for various reasons. To access and manage each of the storage clusters may require the user to maintain separate connections for each of the storage clusters.

To reduce the number of browser sessions, a user associated with storage cluster 904 may register storage cluster 904 with cloud service system 908. The user associated with storage cluster 904 may also register one or more other storage clusters with cloud service system 908. This enables the user to access and manage the storage clusters from a single unified interface.

Storage cluster 904 may be located a firewall. As a result, cloud service system 908 cannot directly initiate a connection with storage cluster 904. However, storage cluster 904 may initiate a process to connect with cloud service system 908.

A user associated with storage cluster 904 via browser 902 may enable storage cluster 904 to communicate with cloud service system 908 and initiate a cluster registration procedure. The user may log into storage cluster 904 using an internet protocol (IP) address associated with storage cluster 904 or a virtual IP (VIP) address associated with one of the nodes of the storage cluster 904. In response to the user enabling storage cluster 904 to communicate with cloud service system 908 and initiating the cluster registration procedure, storage cluster 904 may generate cluster state information (e.g., a cluster identifier, a cluster incarnation identifier, the name of a cluster, a security token, and/or a name of a host) that allows cloud service system 908 to register storage cluster 904. The security token may include a nonce, a one-time password, a reusable password, etc. The name of the host corresponds to the manner in which the user logged into storage cluster 904. For example, the name of the host may correspond to a VIP address associated with one of the nodes of storage cluster 904 in the event a user logged into storage cluster 904 using a VIP address associated with one of the storage cluster nodes. The name of the host may correspond to an IP address associated with one of the nodes of storage cluster 904 in the event a user logged into storage cluster 904 using an IP address associated with one of the storage cluster nodes. The cluster state information enables cloud service system 908 to identify storage cluster 904. The cluster state information may be generated by one of the storage cluster nodes and may be propagated to the other nodes of storage cluster 904. This allows any of the storage cluster nodes to finish a cluster registration procedure when directed by cloud service system 908.

Storage cluster 904 is configured to provide the cluster state information to browser 902 and to cause browser 902 to be redirected to cloud identity provider 906. The redirection may include cluster state information associated with storage cluster 904. For example, the cluster state information may include the cluster identifier, configuration information (e.g., native interface version information), the cluster incarnation identifier, the name of a cluster, the security token (e.g., nonce, a one-time password, reusable password, etc.), and/or the name of a host. The cluster state information included in the redirect may be encrypted using a shared secret that is shared between storage cluster 904 and cloud service system 908

Cloud identity provider 906 (e.g., Salesforce) may be an identity provider for a cloud service. Cloud identity provider 906 may store a data structure that maps a user account with one or more storage clusters. Cloud identity provider 906 may request the user to provide via browser 902 authentication information associated with the user. For example, the user may provide account information associated with cloud identity provider 906, such as a username and password. The data structure associated with cloud identity provider 906 may associate the received account information with one or more storage clusters. The user associated with browser 902 may only access the one or more storage clusters that are associated with the received account information.

Upon successful authentication, cloud identity provider 906 may redirect browser 902 to cloud service system 908. The redirection may include the cluster state information and a code. Browser 902 is configured to provide the cluster state information and the code to cloud service system 908. The cluster state information may be encrypted. Cloud service system 908 may decrypt the encrypted cluster state information using the shared secret. Cloud service system is configured to store the cluster state information. Cloud service system 908 may be configured to store the cluster state information for a predetermined period of time (e.g., 15 minutes). In the event a connection is not established between cloud service system 908 and storage cluster 904, cloud service system 908 is configured to delete the cluster state information. In the event cloud service system 908 is unable to decrypt the encrypted cluster state information, cloud service system 908 may terminate the cluster registration procedure. This indicates that the cluster registration procedure was not initiated by a valid storage cluster.

Cloud service system 908 is configured to provide the code to cloud identity provider 906 and to request an access token from the cloud identity provider 906. The cloud identity provider may validate the code by comparing the code with the code provided in the browser redirect. The code is validated in the event the code received from the cloud service system matches the code provided in the browser redirect. Upon validating the code, cloud identity provider 906 is configured to provide the access token to cloud service system 908. In response to receiving the access token, cloud service system 908 is configured to request user information based on one or more parameters. The parameter may be the access token. Cloud identity provider 906 is configured to provide user information to cloud service system 908. The user information includes account information associated with the authentication information provided by the user. The account information may indicate the one or more storage clusters associated with a user. Cloud service system 908 may be configured to verify that the user information matches the cluster state information. For example, cloud service system 908 may be configured to verify that a cluster identifier included in the user information matches the cluster identifier included in the cluster state information. In the event the user information does not match the cluster state information, cloud service system 908 is configured to terminate the cluster registration procedure. In the event the user information matches the cluster state information, cloud service system 908 is configured to redirect browser 902 to the cluster having the host name included in the cluster state information. Browser 902 may be redirected to a node of storage cluster 904 based on the manner in which the user logged into storage cluster 904. For example, browser 902 is redirected to a VIP address associated with a storage cluster node in the event the user logged into the storage cluster using the VIP address associated with a storage cluster node. In other embodiments, browser 902 is redirected to an IP address associated with a storage cluster node in the event the user logged into storage cluster 904 using the IP address associated with the storage cluster node.

The redirect may cause the storage cluster to which browser 104 is directed to finish the cluster registration procedure. The cluster registration procedure may be finished by any of the nodes of storage cluster 904 even though the host name is associated with one of the storage cluster nodes because the cluster state information has been synced to all of the storage cluster nodes. The storage cluster node handling the redirect may request a certificate from cloud service system 908 and provide the cluster state information to the cloud service system 908. The cluster state information may be encrypted. Cloud service system 908 may compare the instance of the security token included in the cluster state information received from storage cluster 904 to the instance of the security token included in the cluster state information received from browser 902 via the cloud identity provider 906 redirect.

In the event the second instance of the security token matches the first instance of the security token, cloud service system 908 is configured to provide a certificate to storage cluster 904. The certificate may enable storage cluster 904 to communicate with cloud service system 908. In some embodiments, the instance of the security token received from the cloud identity provider 906 via browser 902 is valid for a predetermined duration (e.g., 15 mins). In the event cloud service system 908 does not receive a security token from a storage cluster that matches the security token received from cloud identity provider 906 via browser 902 within the predetermined duration, cloud service system 908 is configured to deny a cluster registration. The storage cluster is configured to store the certificate.

The certificate is signed by cloud service system 908. The certificate may be provided back to cloud service system 908 to allow cloud service system 908 to verify that storage cluster 904 can be trusted because it possesses a certificate that was signed by cloud service system 908. In the event the instance of the security token received from storage cluster 904 does not match the instance of the security token received from cloud identity provider 906 via browser 902, cloud service system 908 does not provide a certificate to storage cluster 904 and a connection cannot be established between the storage cluster 904 and cloud service system 908. Upon receiving the certificate, storage cluster 904 is configured to store the certificate. Storage cluster 904 includes a distributed store and the received certificate is stored in the distributed store. Storage cluster 904 is comprised of a master storage node and a plurality of secondary storage nodes. In the event the master storage node is offline, one of the remaining storage nodes may re-establish communications with cloud service system 908 using the certificate that is stored in the distributed store.

In response to receiving the certificate, storage cluster 904 is configured to redirect browser 902 to the initial login page, to provide a notification indicating that the cluster registration procedure was successful, and to establish bidirectional communications between storage cluster 904 and cloud service system 908. The notification indicates that the cluster registration procedure was successful, i.e., storage cluster 904 is registered with cloud service system 908. In the event the cluster registration procedure is successful, the user may access storage cluster 904 via cloud service system 908 without having to establish a VPN connection with storage cluster 904. The user may perform the same procedure for a plurality of other storage clusters. Subsequently, the user may manage the one or more storage clusters via a single browser session. After the user registers a storage cluster, the storage cluster may be configured to provide cloud service system 908 the metadata associated with a plurality of objects stored in the primary storage system associated with a registered storage cluster and the metadata associated with a plurality of objects stored in the registered storage cluster. Cloud service system 908 may provide a unified metadata interface that allows a user to perform a global search based on metadata attributes associated with a plurality of objects stored in storage domains associated with the user.

Figure 10:
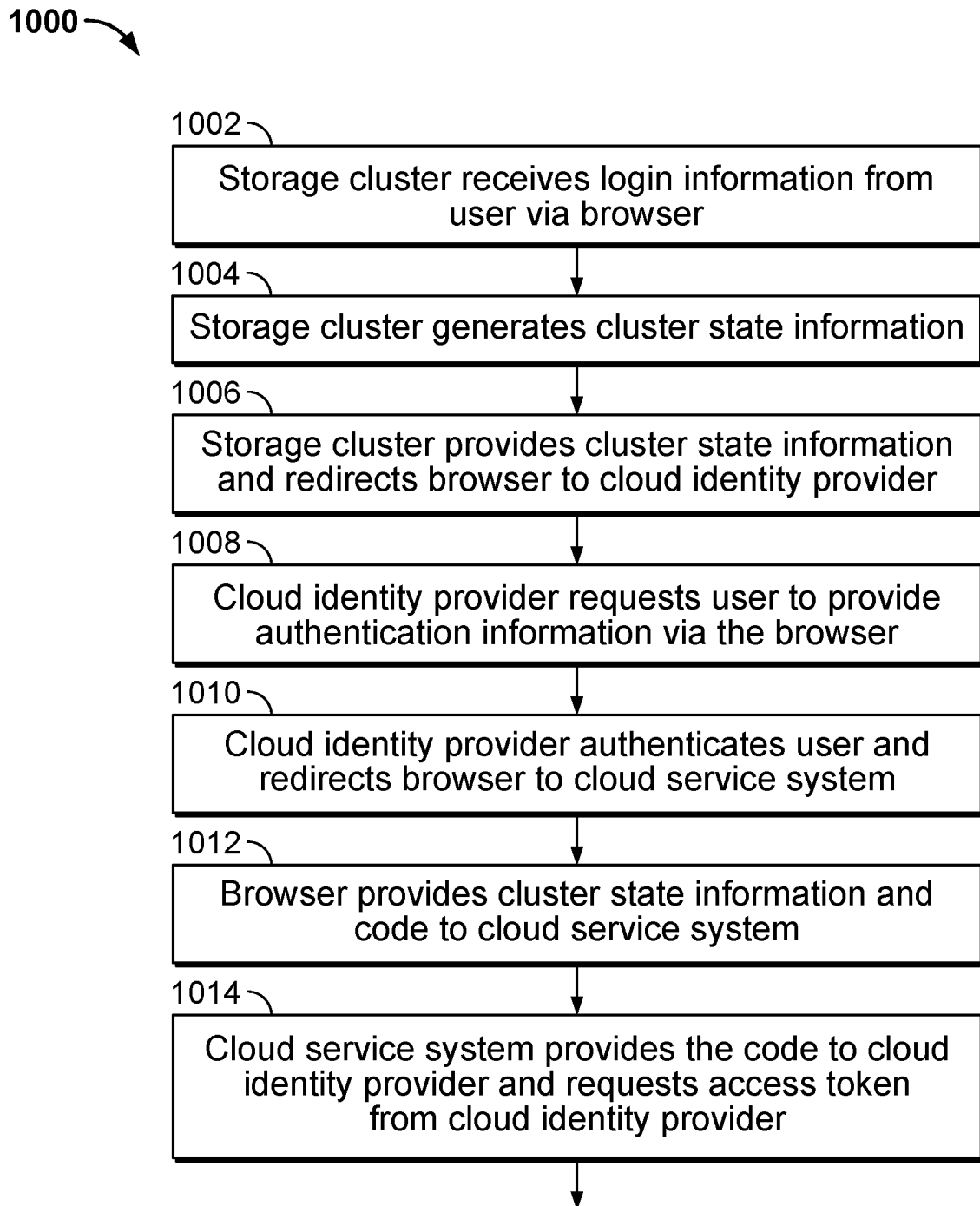
FIG. 10 is an example of a process for registering a storage cluster in accordance with some embodiments.
Figure 10:
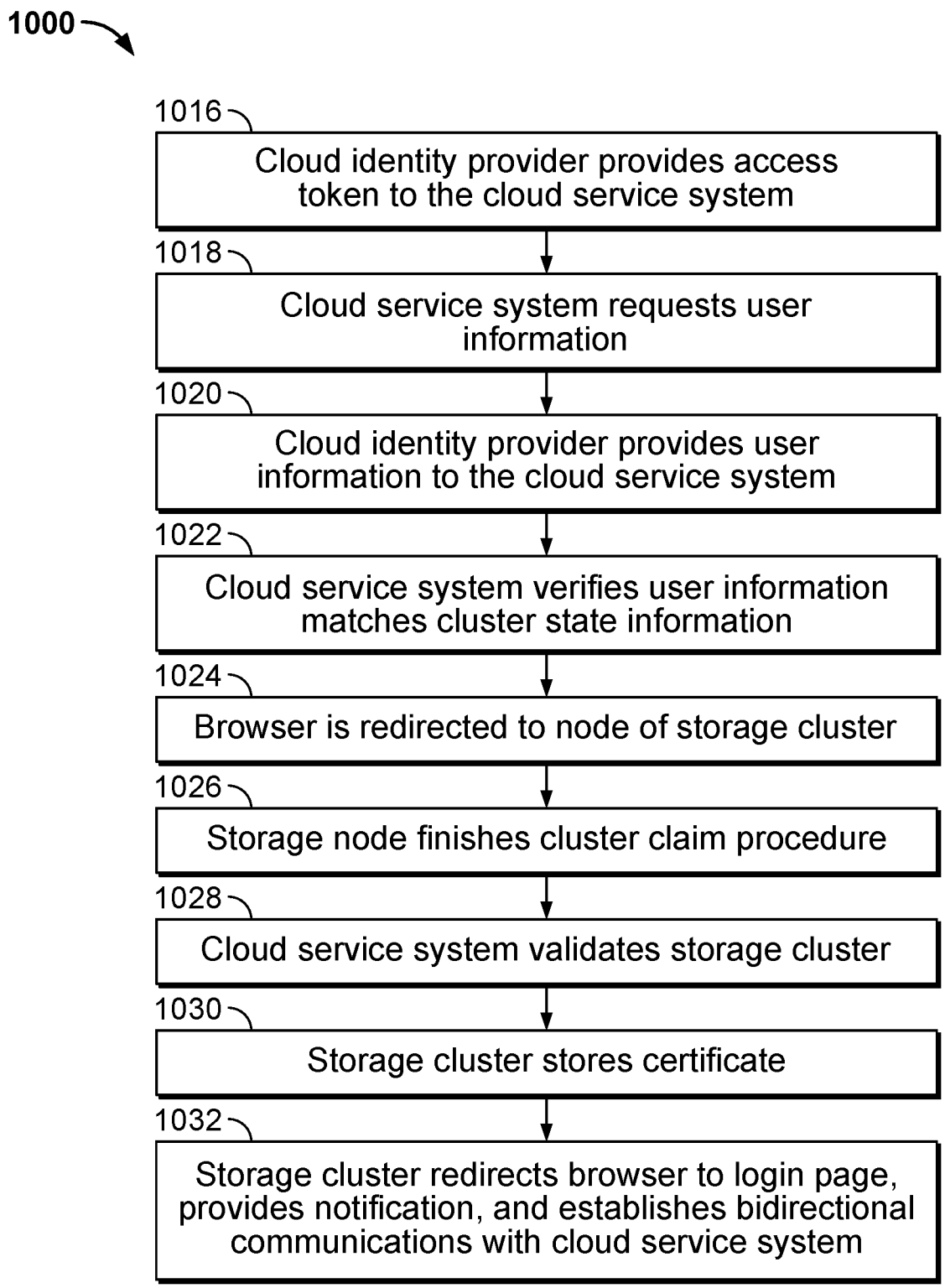

FIG. 10 is an example of a process for registering a storage cluster in accordance with some embodiments. In the example shown, process 1000 may be performed by a system for registering a storage cluster, such as system 900.

At 1002, login information is received at a storage cluster from a user via a browser. The user may log into the storage cluster using an internet protocol (IP) address associated with the storage cluster or a virtual IP (VIP) address associated with one of the nodes of the storage cluster.

In response to a successful login, the storage cluster may provide a user interface that allows the user to enable a cluster registration. A cluster registration procedure is a procedure that enables a user to access and manage one or more storage cluster via a cloud service system. A user may enable a cluster registration procedure via the browser associated with the user device.

A user associated with the storage cluster may be associated with a plurality of storage clusters. The storage clusters may be remote from each other. Instead of establishing a separate browser session with each storage cluster to manage each storage cluster, the user may desire to interact with the plurality of storage cluster using a single browser session.

At 1004, the storage cluster generates the cluster state information in response to the user enabling the cluster registration. The cluster state information may include a cluster identifier, configuration information (e.g., native interface version information), a cluster incarnation identifier, a name of a cluster, a security token (e.g., nonce, a one-time password, reusable password, etc.), and/or a name of a host. The name of the host corresponds to the manner in which the user logged into the storage cluster. For example, the name of the host may correspond to a VIP address associated with one of the nodes of the storage cluster in the event a user logged into the storage cluster using a VIP address associated with one of the storage cluster nodes. The name of the host may correspond to an IP address associated with one of the nodes of the storage cluster in the event a user logged into the storage cluster using an IP address associated with one of the storage cluster nodes. A storage node of the storage cluster is configured to generate the cluster state information and to propagate the generated cluster state information to the other nodes of the storage cluster. This enables any of the storage cluster nodes to complete the cluster registration procedure when directed by a cloud service system. The cluster state information allows the cloud service system to identify a storage cluster that is requesting a cluster registration to be established.

At 1006, cluster state information is provided from the storage cluster to the browser associated with a user and the browser associated with the user is redirected to a cloud identity provider. In some embodiments, the provided cluster state information is encrypted using a shared secret that is shared between a storage cluster and a cloud service system. This prevents non-authorized users from attempting to register the storage cluster.

At 1008, the cloud identity provider requests the user to provide authentication information via the browser. For example, the user may provide account information associated with the cloud identity provider, such as a username and password. The user logs into the cloud identity provider and the browser associated with the user provides the cluster state information to the cloud identity provider. The account information associated with the cloud identity provider may be associated with one or more storage clusters. A user may only access the one or more storage clusters to which the account information associated with the cloud identity provider is associated.

At 1010, the cloud identity provider authenticates the user and redirects the browser associated with the user to a cloud service system. The redirect includes the cluster state information and a code.

At 1012, the browser associated with the user provides the cluster state information and the code to the cloud service system. The cluster state information may be encrypted. The cloud service system may decrypt the encrypted cluster state information using the shared secret. The cloud service system is configured to store the cluster state information. In the event the cloud service system is unable to decrypt the encrypted cluster state information, the cloud service system may terminate the cluster registration procedure. This indicates that the cluster registration procedure was not initiated by a valid storage cluster.

At 1014, the cloud service system provides the code to the cloud identity provider and requests an access token from the cloud identity provider.

At 1016, in response to validating the code, the cloud identity provider provides the access token to the cloud service system. At 1018, in response to receiving the access token, the cloud service system requests user information based on one or more parameters. The parameter may be the access token. At 1020, the cloud identity provider provides user information to the cloud service system. The user information includes account information associated with the authentication information provided by the user. The account information may indicate the one or more storage clusters associated with a user.

At 1022, the cloud service system is configured to verify that the user information matches the cluster state information. For example, the cloud service system may be configured to verify that a cluster identifier included in the user information matches the cluster identifier included in the cluster state information. In the event the user information does not match the cluster state information, the cloud service system is configured to terminate the cluster registration procedure. In the event the user information matches the cluster state information, the cloud service system is configured to redirect the browser associated with the user to the cluster having the host name included in the cluster state information.

At 1024, the browser associated with the user is redirected to a node of the storage cluster based on the manner in which the user logged into the storage cluster. For example, the browser associated with the user is redirected to a VIP address associated with a storage cluster node in the event the user logged into the storage cluster using the VIP address associated with a storage cluster node. In other embodiments, the browser associated with the user is redirected to an IP address associated with a storage cluster node in the event the user logged into the storage cluster using the IP address associated with the storage cluster node.

At 1026, the redirect may cause the storage cluster to which the browser is directed to finish the cluster registration procedure. The cluster registration procedure may be finished by any of the nodes of the storage cluster even though the host name is associated with one of the storage cluster nodes because the cluster state information has been synced to all of the storage cluster. The storage cluster node handling the redirect may request a certificate from the cloud service system and provide the cluster state information to the cloud service system. The cluster state information may be encrypted.

At 1028, the cloud service system is configured to validate the storage cluster at least in part by comparing the second instance of the security token included in the cluster state information received from the storage cluster to the first instance of the security token included in the cluster state information received from the browser via the cloud identity provider redirect. In the event the second instance of the security token matches the first instance of the security token, the cloud service system is configured to provide a certificate to the storage cluster. The certificate may enable the storage cluster to communicate with the cloud service system. In some embodiments, the instance of the security token received from the cloud identity provider is valid for a predetermined duration (e.g., 15 mins). In the event the cloud service system does not receive a security token from a storage cluster that matches the security token received from the cloud identity provider within the predetermined duration, the cloud service system is configured to deny a cluster registration.

At 1030, the storage cluster is configured to store the certificate. The storage cluster includes a distributed store and the received certificate is stored in the distributed store. The storage cluster is comprised of a master storage node and a plurality of secondary storage nodes. In the event the master storage node is offline, one of the remaining storage nodes may re-establish communications with the cloud service system using the certificate that is stored in the distributed store.

At 1032, the storage cluster is configured to redirect the browser to the initial login page, to provide a notification indicating that the cluster registration procedure was successful, and to establish bidirectional communications between the storage cluster and the cloud service system.

In the event the cluster registration procedure is successful, the user may access and manage the storage cluster via the cloud service system without having to establish a VPN connection with the storage cluster. The user may perform the same procedure for a plurality of other storage clusters. Subsequently, the user may manage the plurality of storage clusters via a single browser session. After the user registers a storage cluster, the storage cluster may be configured to provide a cloud service system the metadata associated with a plurality of objects stored in the primary storage system associated with a registered storage cluster and the metadata associated with a plurality of objects stored in the registered storage cluster. A cloud service system may provide a unified metadata interface that allows a user to perform a global search based on metadata attributes associated with a plurality of objects stored in storage domains associated with the user.

Figure 11:
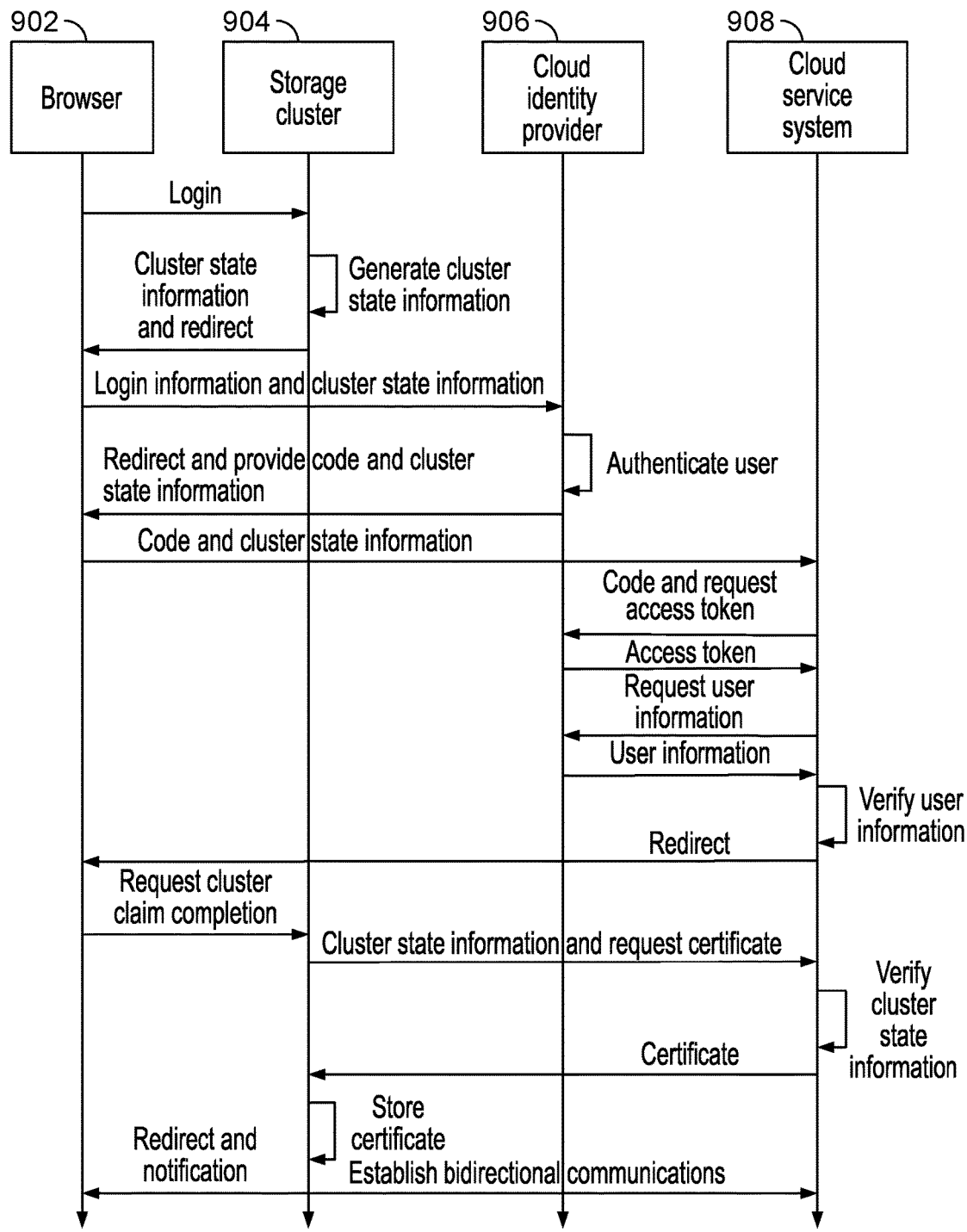
FIG. 11 is a diagram illustrating a timeline for registering a storage cluster in accordance with some embodiments.

FIG. 11 is a diagram illustrating a timeline for registering a storage cluster in accordance with some embodiments. In the example shown, timeline 1100 may be implemented by a system for registering a storage cluster, such as system 900.

Browser 902 logs into storage cluster 904. A user associated with browser 902 may log into storage cluster 904 using an internet protocol (IP) address associated with the storage cluster or a virtual IP (VIP) address associated with one of the nodes of the storage cluster. In response to a successful login, storage cluster 904 may provide a user interface that allows a user associated with browser 902 to enable a cluster registration procedure.

Storage cluster 904 is configured to generate cluster state information in response to the user enabling the cluster registration procedure. The cluster state information may include a cluster identifier, configuration information (e.g., native interface version information), a cluster incarnation identifier, a name of a cluster, a security token (e.g., nonce, a one-time password, reusable password, etc.), and/or a name of a host. The cluster state information allows cloud service system 908 to identify a storage cluster of a storage domain that is requesting a cluster registration to be established. The name of the host corresponds to the manner in which the user logged into the storage cluster. For example, the name of the host may correspond to a VIP address associated with one of the nodes of the storage cluster in the event a user logged into the storage cluster using a VIP address associated with one of the storage cluster nodes. The name of the host may correspond to an IP address associated with the storage cluster in the event a user logged into the storage cluster using an IP address associated with the storage cluster. The cluster state information may be generated by one of the storage cluster nodes and propagated to the other nodes of the storage cluster. This allows any of the storage cluster nodes to finish a cluster registration procedure when directed by the cloud service system.

Storage cluster 904 provides the cluster state information to browser 902 and browser 902 is redirected to a cloud identity provider 906. The cluster state information may be encrypted using a shared secret that is shared between storage cluster 904 and cloud service system 908. Cloud identity provider 906 requests the user to provide authentication information via the browser 902. For example, the user may provide account information associated with cloud identity provider 906, such as a username and password.

The user logs into cloud identity provider 906 and browser 902 provides the cluster state information to cloud identity provider 906. The account information associated with the cloud identity provider may be associated with one or more storage cluster. A user may only access the one or more storage clusters to which the account information associated with the cloud identity provider is associated.

Cloud identity provider 906 authenticates the user. For example, the user may provide account information associated with the cloud identity provider, such as a username and password. The account information associated with the cloud identity provider may be associated with one or more storage cluster. A user may only access the one or more storage cluster to which the account information is associated.

Cloud identity provider 906 redirects browser 902 to cloud service system 908. The redirect includes the cluster state information and a code.

Browser 902 provides the cluster state information and the code to cloud service system 908. The cluster state information may be encrypted. The cloud service system may decrypt the encrypted cluster state information using the shared secret. The cloud service system is configured to store the cluster state information. In the event the cloud service system is unable to decrypt the encrypted cluster state information, the cloud service system may terminate the cluster registration procedure. This indicates that the cluster registration procedure was not initiated by a valid storage cluster.

Cloud service system 908 provides the code to cloud identity provider 906 and to request an access token from cloud identity provider 906. Cloud identity provider 906 may validate the code by comparing the code with the code provided in the browser redirect. The code is validated in the event the code received from cloud service system 908 matches the code provided in the browser 902 redirect.

Upon validating the code, cloud identity provider 906 provides the access token to cloud service system 908.

In response to receiving the access token, cloud service system 908 is configured to request user information based on one or more parameters. The parameter may be the access token.

Cloud identity provider 108 is configured to provide user information to cloud service system 908. The user information includes account information associated with the authentication information provided by the user. The account information may indicate the one or more storage clusters associated with a user.

Cloud service system 908 verifies that the user information matches the cluster state information. For example, the cloud service system may be configured to verify that a cluster identifier included in the user information matches the cluster identifier included in the cluster state information. In the event the user information does not match the cluster state information, cloud service system 908 is configured to terminate the cluster registration procedure. In the event the user information matches the cluster state information, cloud service system 908 is configured to redirect the browser 108 to the storage cluster having the host name included in the cluster state information.

Browser 902 is redirected to a node of storage cluster 904 based on the manner in which the user logged into storage cluster 904. For example, the browser associated with the user is redirected to a VIP address associated with a storage cluster node in the event the user logged into storage cluster 904 using the VIP address associated with a storage cluster node. In other embodiments, browser 902 is redirected to an IP address associated with a storage cluster node in the event the user logged into storage cluster 904 using the IP address associated with the storage cluster node.

The redirect causes storage cluster 904 to finish the cluster registration procedure. The cluster registration procedure may be finished by any of the nodes of the storage cluster even though the host name is associated with one of the storage cluster nodes because the cluster state information has been synced to all of the storage cluster nodes.

The storage cluster node of storage cluster 904 handling the redirect may request a certificate from cloud service system 908 and provide the cluster state information to the cloud service system 908. The cluster state information may be encrypted. The cloud service system may compare the second instance of the security token included in the cluster state information received from the storage cluster to the first instance of the security token included in the cluster state information received from the browser via the cloud identity provider redirect.

In the event the second instance of the security token matches the first instance of the security token, cloud service system 908 is configured to provide a certificate to storage cluster. The certificate may enable storage cluster 904 to communicate with cloud service system 908. In some embodiments, the instance of the security token received from browser 902 via cloud identity provider 906 is valid for a predetermined duration (e.g., 15 mins). In the event cloud service system 908 does not receive a security token from a storage cluster that matches the security token received from the cloud identity provider within the predetermined duration, the cloud service system is configured to deny a cluster registration. Storage cluster 904 stores the certificate.

In response to receiving the certificate, the storage cluster is configured to redirect browser 902 to the initial login page, to provide a notification indicating that the cluster registration procedure was successful, and to establish bidirectional communications between storage cluster 904 and cloud service system 908. In the event the cluster registration is successful, the user may access the storage cluster via the cloud service system without having to establish a VPN connection with the cluster. The user may perform the same procedure for a plurality of other storage clusters. Subsequently, the user may manage the one or more storage clusters via a single browser session. After the user registers a storage cluster, the storage cluster may be configured to provide a cloud service system the metadata associated with a plurality of objects stored in the primary storage system associated with a registered storage cluster and the metadata associated with a plurality of objects stored in the registered storage cluster. The cloud service system may provide a unified metadata interface that allows a user to perform a global search based on metadata attributes associated with a plurality of objects stored in storage domains associated with the user.

Figure 12:
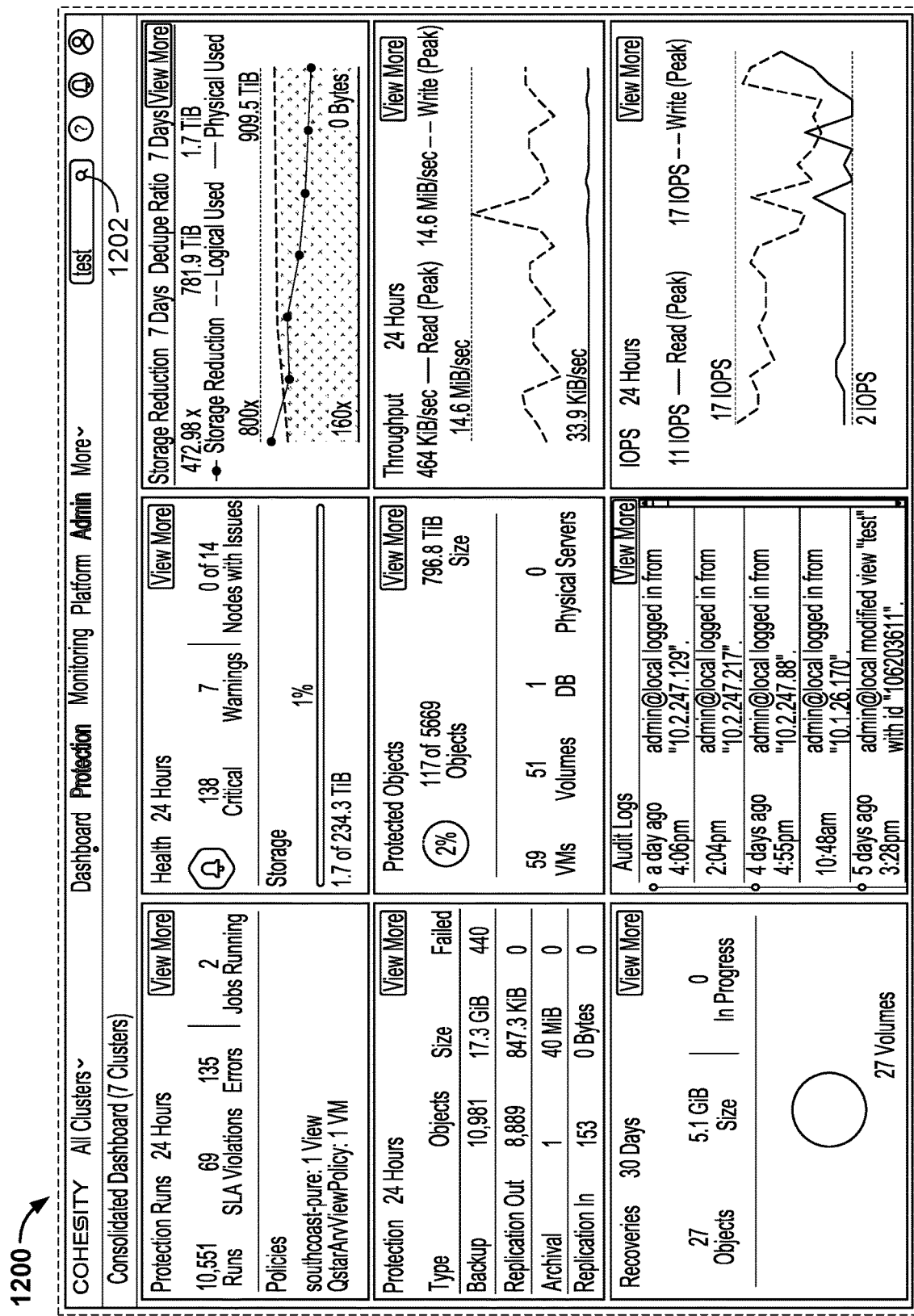
FIG. 12 is an example of a user interface in accordance with some embodiments.

FIG. 12 is an example of a user interface in accordance with some embodiments. In the example shown, user interface 1200 may be provided by a cloud service system, such as cloud service system 131. In some embodiments, user interface 1200 is provided by a master storage cluster, such as storage cluster 104, storage cluster 114, or storage cluster 124.

In the example shown, user interface 1200 includes a unified metadata search interface 1202. Unified metadata search interface 1202 may receive a request for one or more objects associated with one or more registered storage clusters (including objects stored in a registered storage cluster or objects stored in a primary storage system associated with a registered storage cluster). The request may include one or more metadata attributes associated with an object. The one or more metadata attributes associated with an object may include, but are not limited to, file name, network name, internet protocol (IP address), VM type, application type, application name, operating system (OS) name, OS type, date backed up, file size, location (e.g., which system stores the object), etc.

In the example shown, seven storage clusters associated with an enterprise have been registered. A user associated with the enterprise may search for one or more objects via unified metadata search interface 1202, using one or more metadata attributes associated with the object. In the example shown, a request for one or more objects with a metadata attribute of "test" has been entered into unified metadata search interface 1202.

User interface 1200 may provide other information associated with one or more registered storage clusters. For example, user interface 1200 may include protection run information, health information, storage reduction information, deduplication information, protection information, protected object information, throughput information, recovery information, audit log information, input/output operations per second (IOPS) information, etc.

FIG. 13 is an example of a user interface in accordance with some embodiments. In the example shown, user interface 1300 may be provided by a cloud service system, such as cloud service system 131. In some embodiments, user interface 1300 is provided by a master storage cluster, such as storage cluster 104, storage cluster 114, or storage cluster 124.

In the example shown, user interface 1300 is displaying a plurality of search results that match a request for one or more objects having a metadata attribute of "test." User interface 1300 may be configured to provide a preview pane 1304 for a selected search result 1302. The preview pane may be configured to display the one or more metadata attributes associated with a selected search result. The one or more displayed metadata attributes may be specific to the selected search result.

In the example shown, preview pane 1304 is displaying metadata attributes associated with the selected search result 1302 "testVolume." For the object "testVolume," preview pane 1304 is displaying metadata attribute information of "type," "NAS," "Clusters" (e.g., the storage clusters in which the object "testVolume" is stored), a location of a backup snapshot associated with the object, a number of backup snapshots performed, and when the last backup snapshot was performed.

Figure 14:
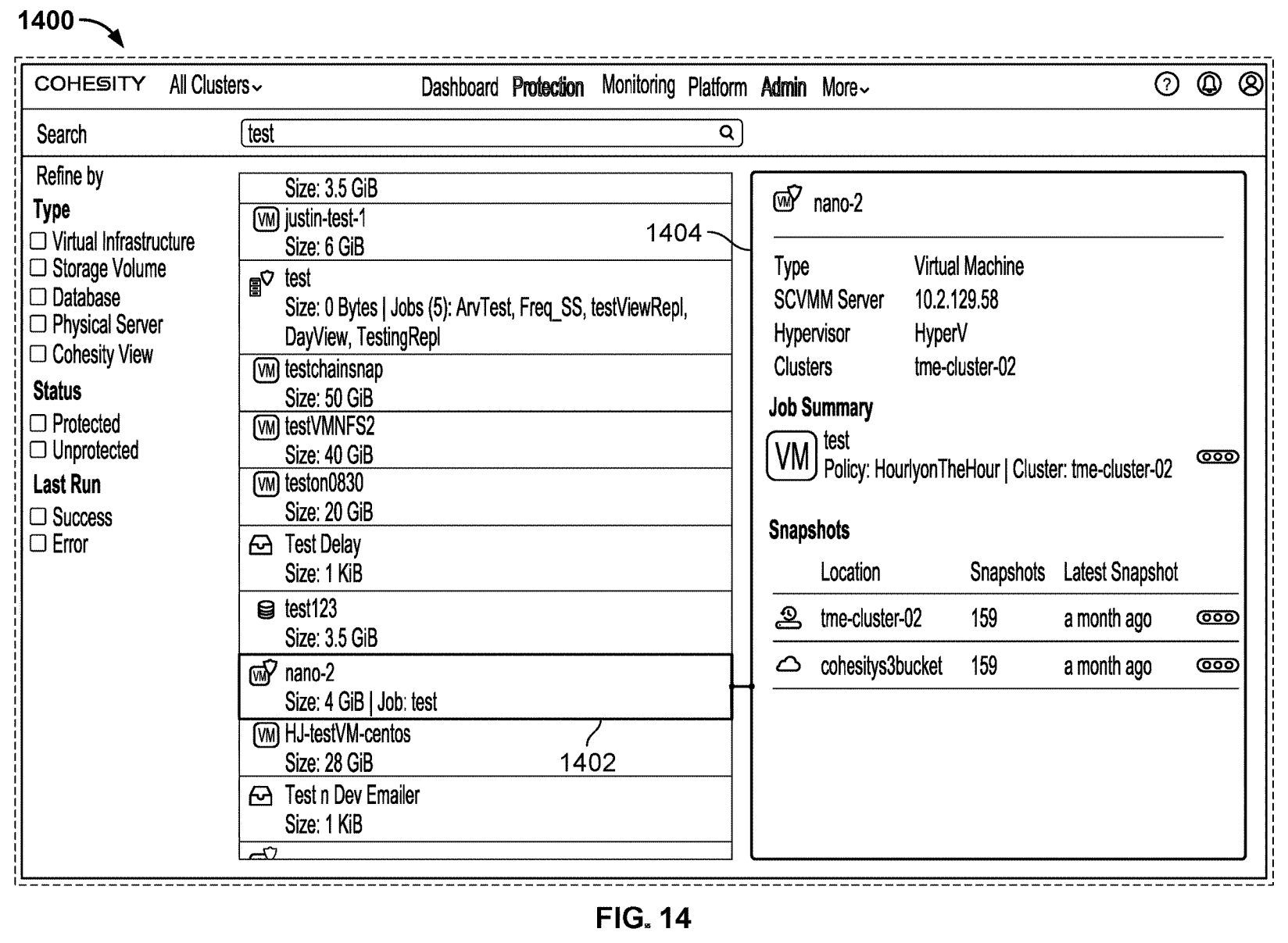

FIG. 14 is an example of a user interface in accordance with some embodiments. In the example shown, user interface 1400 may be provided by a cloud service system, such as cloud service system 131. In some embodiments, user interface 1400 is provided by a master storage cluster, such as storage cluster 104, storage cluster 114, or storage cluster 124.

In the example shown, user interface 1400 is displaying a plurality of search results that match a request for one or more objects having a metadata attribute of "test." User interface 1400 may be configured to provide a preview pane 1404 for a selected search result 1402. The preview pane may be configured to display the one or more metadata attributes associated with a selected search result. The one or more displayed metadata attributes may be specific to the selected search result.

In the example shown, preview pane 1304 is displaying metadata attributes associated with the selected search result 1402 "nano-2." The object "nano-2" is associated with a "Job:test." For the object "nano-2," preview pane 1404 is displaying metadata attribute information of "type," "SCVMM Server," "Hypervisor," "Clusters" (e.g., the storage clusters in which the object "nano-2" is stored), job summary information, a location of two different backup snapshots associated with the object, a number of backup snapshots performed at each location, and when the last backup snapshot was performed at each location.

Figure 15:
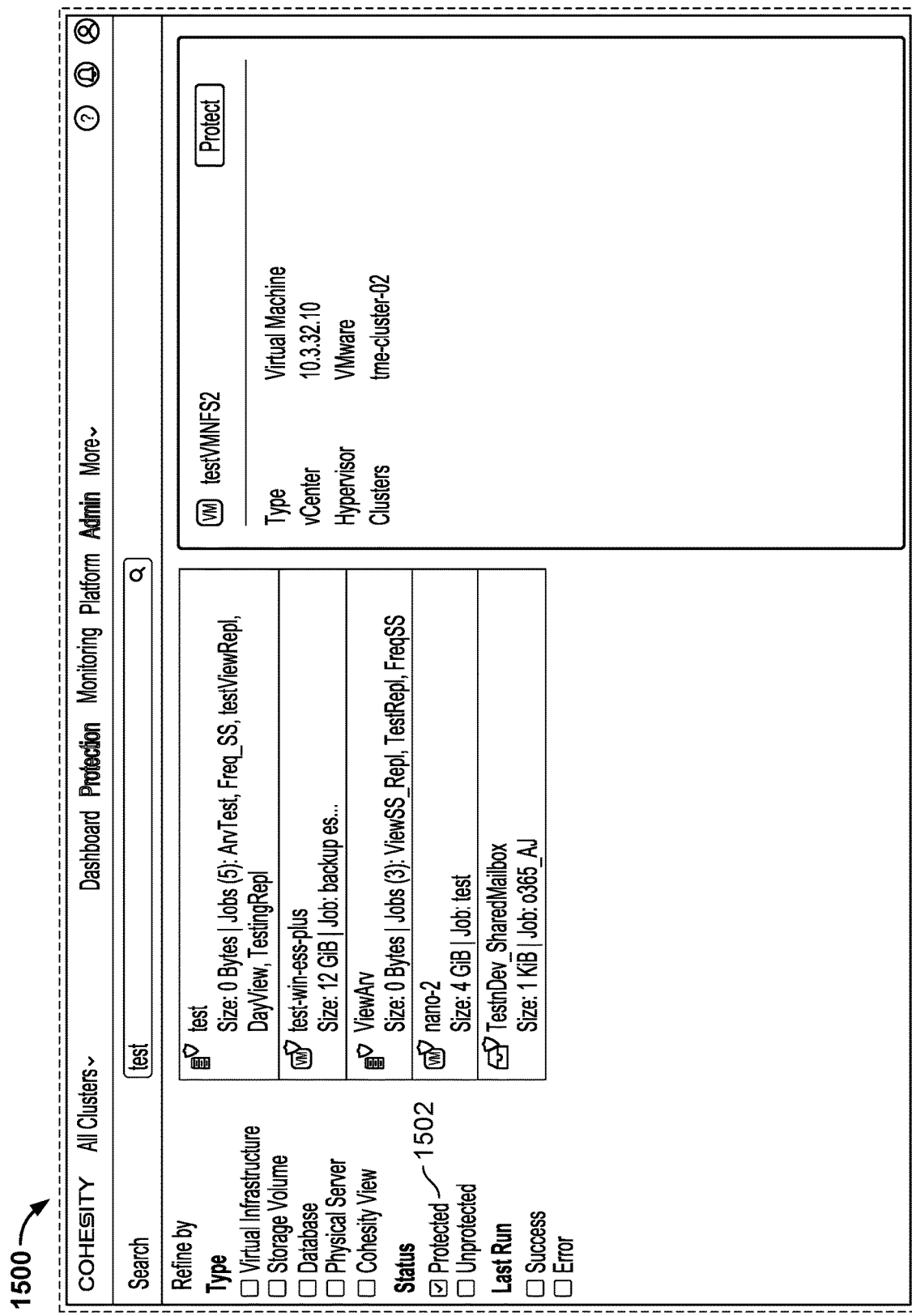
FIG. 15 is an example of a user interface in accordance with some embodiments.

FIG. 15 is an example of a user interface in accordance with some embodiments. In the example shown, user interface 1500 may be provided by a cloud service system, such as cloud service system 131. In some embodiments, user interface 1500 is provided by a master storage cluster, such as storage cluster 104, storage cluster 114, or storage cluster 124.

In the example shown, user interface 1500 is displaying a plurality of filtered search results that match a request for one or more objects having a metadata attribute of "test." The one or more provided search results may be filtered based on "type," "status," and "last run." In the example shown, user interface 1500 is displaying objects having a metadata attribute of "test" and have a status 1502 of "protected."

Figure 16:
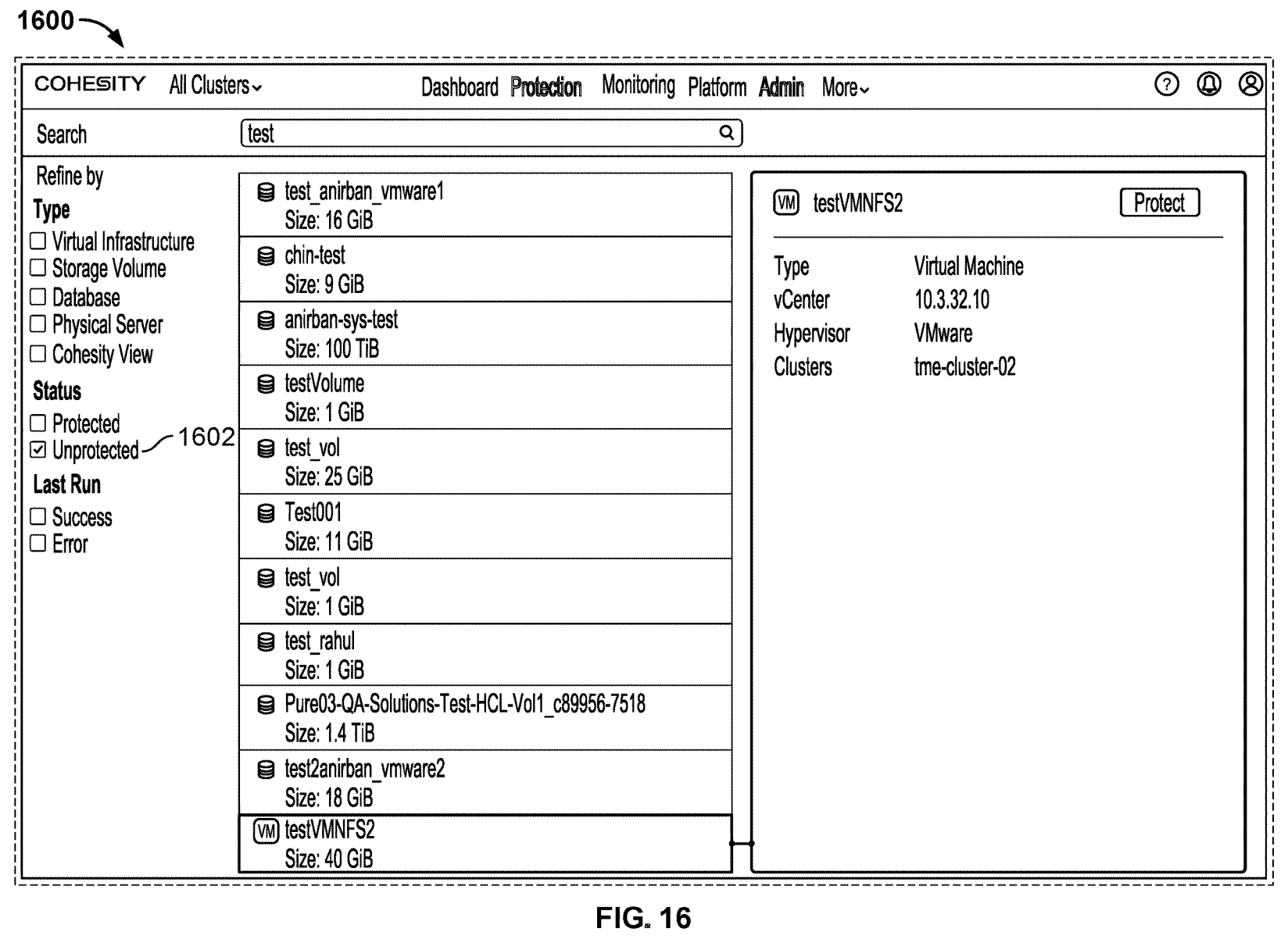

FIG. 16 is an example of a user interface in accordance with some embodiments. In the example shown, user interface 1600 may be provided by a cloud service system, such as cloud service system 131. In some embodiments, user interface 1600 is provided by a master storage cluster, such as storage cluster 104, storage cluster 114, or storage cluster 124.

In the example shown, user interface 1600 is displaying a plurality of filtered search results that match a request for one or more objects having a metadata attribute of "test." The one or more provided search results may be filtered based on "type," "status," and "last run." In the example shown, user interface 1600 is displaying objects having a metadata attribute of "test" and have a status 1602 of "unprotected."

Figure 17:
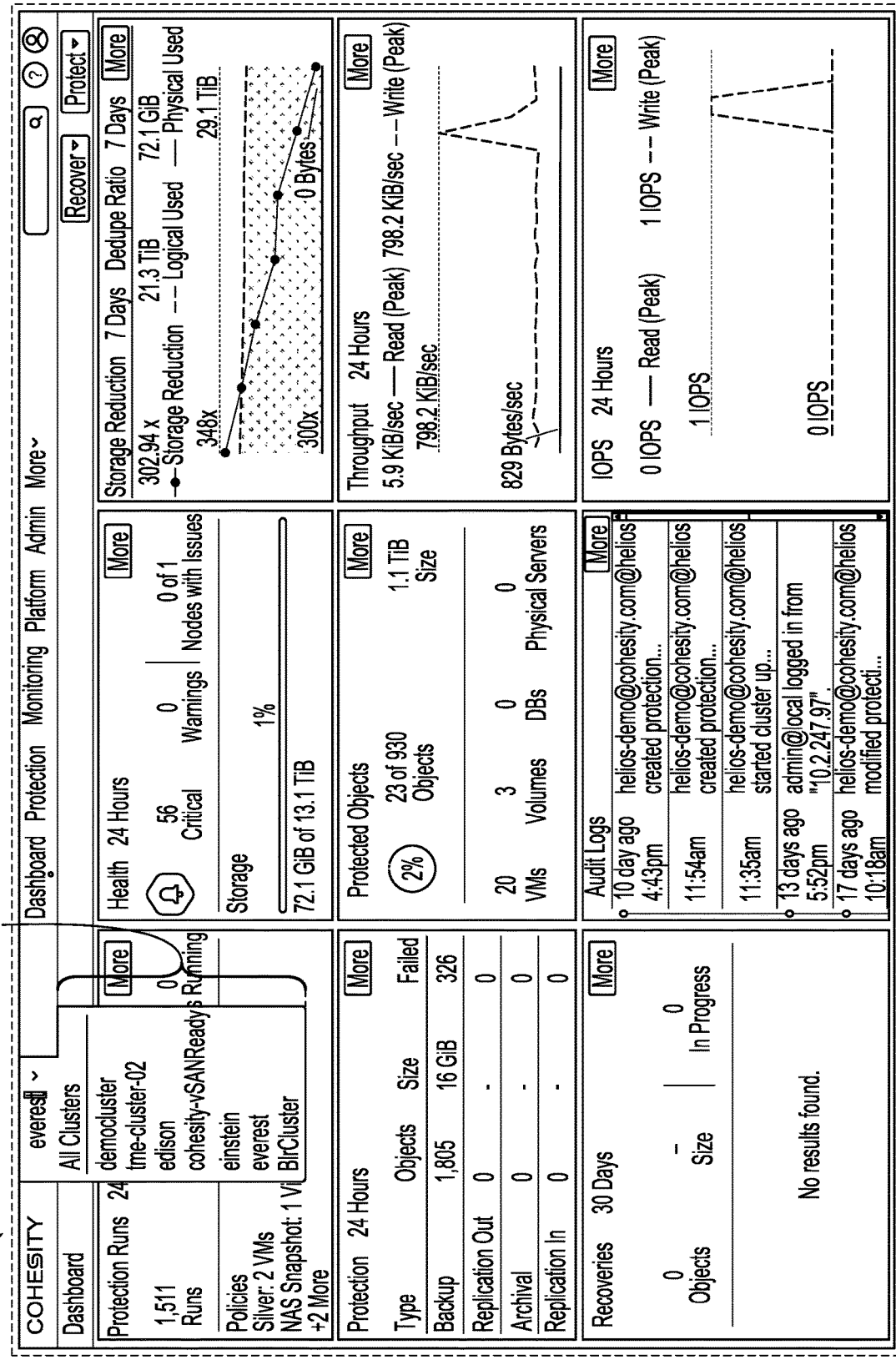
FIG. 17 is an example of a user interface in accordance with some embodiments.

FIG. 17 is an example of a user interface in accordance with some embodiments. In the example shown, user interface 1700 may be provided by a cloud service system, such as cloud service system 131. In some embodiments, user interface 1700 is provided by a master storage cluster, such as storage cluster 104, storage cluster 114, or storage cluster 124.

In the example shown, user interface 1700 is configured to provide a central storage management interface for a plurality of registered storage clusters. User interface 1700 includes a drop down menu 1702 that lists a plurality of registered storage clusters. In the example shown, the storage clusters having cluster names "democluster," "tmecluster-02," "edison," "cohesity-vSANReady," "einstein," "everest," and "BirCluster" have been registered with a cloud service system, such as cloud service system 131. In other embodiments, the storage clusters are registered with a master storage cluster. A registered storage cluster may be displayed in drop down menu 1702 even though the registered storage cluster is offline (e.g., "democluster" is offline). In the example shown, user interface 1700 has received an indication (e.g., selection) for the storage cluster with the cluster name "everest." In response to the indication, the cloud service system is configured to may be configured to determine a version of a native user interface associated with the storage cluster with the cluster name "everest" and load the determined native user interface version. The loaded native user interface version may be accessed via a portion of user interface 1700.

FIG. 18 is an example of a user interface in accordance with some embodiments. In the example shown, user interface 1800 may be provided by a cloud service system, such as cloud service system 131. In some embodiments, user interface 1800 is provided by a master storage cluster, such as storage cluster 104, storage cluster 114, or storage cluster 124.

In the example shown, user interface 1800 is configured to display cluster information associated with one or more registered storage clusters. The cluster information may be provided to the cloud service system when a storage cluster is registered with the cloud service system. The cluster information may include a cluster name, a cluster ID, a type, the number of nodes associated with the storage cluster, a storage capacity of the storage cluster, a health indicator associated with the storage cluster, a connection indicator associated with the storage cluster, and version information associated with the storage cluster. The version information associated with the storage cluster may correspond to a version of a native user interface associated with the storage cluster. For example, a storage cluster associated with a version of "6.2" may have a different native user interface than storage cluster associated with a version of "6.1." In some embodiments, incremental upgrades of a version may be associated with the same version of the native user interface. For example, version "6.1.1," "6.1.1.d," "6.1.2," etc. may be associated with the same version of the native user interface.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, at a cloud service system, metadata associated with content stored in a plurality of different storage domains, wherein the cloud service system receives the metadata associated with content stored in the plurality of different storage domains via a plurality of persistent connection virtualization containers, wherein each of the plurality of different storage domains includes a corresponding secondary storage cluster, wherein a first persistent connection virtualization container of the plurality of persistent connection virtualization containers maintains bidirectional communications between the cloud service system and a first secondary storage cluster associated with a first storage domain of the plurality of different storage domains and a second persistent connection virtualization container of the plurality of persistent connection virtualization containers maintains bidirectional communications between the cloud service system and a second secondary storage cluster associated with a second storage domain of the plurality of different storage domains, wherein the first secondary storage cluster provides to the cloud service system via the first persistent connection virtualization container, first metadata associated with content stored in a first primary storage system to which the first secondary storage cluster is associated and second metadata associated with content stored in the first secondary storage cluster and the second secondary storage cluster provides to the cloud service system via the second persistent connection virtualization container, third metadata associated with content stored in a second primary storage system to which the second secondary storage cluster is associated and fourth metadata associated with content stored in the second secondary storage cluster;
storing and indexing together, at the cloud service system, the first metadata associated with content stored in the first primary storage system, the second metadata associated with content stored in the first secondary storage cluster, the third metadata associated with content stored in the second primary storage system, and the fourth metadata associated with content stored in the second secondary storage cluster; and
providing, at the cloud service system, a unified metadata search interface for metadata associated with content stored in the first primary storage system, the second primary storage system, the first secondary storage cluster, and the second secondary storage cluster.

2. The method of claim 1, wherein first secondary storage cluster and the second secondary storage cluster are registered with the cloud service system.

3. The method of claim 2, wherein the cloud service system includes a user interface service virtualization container, wherein the user interface service virtualization container is configured to provide a user interface, wherein the user interface includes the unified metadata search interface.

4. The method of claim 1, wherein the first metadata associated with content stored in the first primary storage system includes metadata associated with one or more objects stored in the first primary storage system.

5. The method of claim 1, wherein the first metadata associated with content stored in the first primary storage system includes metadata associated with one or more objects backed up from the first primary storage system to the first secondary storage cluster.

6. The method of claim 1, wherein the metadata associated with content received from the plurality of different storage domains is received according to an update policy.

7. The method of claim 1, wherein providing the unified metadata search interface further includes:
receiving a request for one or more objects based on one or more metadata attributes;
determining one or more indexed objects matching the one or more metadata attributes; and
providing an indication of the one or more indexed objects satisfying the request.

8. The method of claim 7, wherein the indication includes a corresponding location associated with the one or more indexed objects satisfying the request.

9. The method of claim 8, wherein the corresponding location includes a storage domain of the different storage domains.

10. The method of claim 9, wherein the corresponding location includes a primary storage system of the storage domain.

11. The method of claim 9, wherein the corresponding location includes a secondary storage cluster of the storage domain.

12. The method of claim 1, wherein the different storage domains are remote from each other.

13. The method of claim 1, wherein the second metadata associated with content stored in the first secondary storage cluster is organized using a tree data structure.

14. A system, comprising:
a processor configured to:
receive, at a cloud service system, metadata associated with content stored in a plurality of different storage domains, wherein the cloud service system receives the metadata associated with content stored in the plurality of different storage domains via a plurality of persistent connection virtualization containers, wherein each of the plurality of different storage domains includes a corresponding secondary storage cluster, wherein a first persistent connection virtualization container of the plurality of persistent connection virtualization containers maintains bidirectional communications between the cloud service system and a first secondary storage cluster associated with a first storage domain of the plurality of different storage domains and a second persistent connection virtualization container of the plurality of persistent connection virtualization containers maintains bidirectional communications between the cloud service system and a second secondary storage cluster associated with a second storage domain of the plurality of different storage domains, wherein the first secondary storage cluster provides to the cloud service system via the first persistent connection virtualization container, first metadata associated with content stored in a first primary storage system to which the first secondary storage cluster is associated and second metadata associated with content stored in the first secondary storage cluster and the second secondary storage cluster provides to the cloud service system via the second persistent connection virtualization container, third metadata associated with content stored in a second primary storage system to which the second secondary storage cluster is associated and fourth metadata associated with content stored in the second secondary storage cluster;

store and index together, at the cloud service system, the first metadata associated with content stored in the first primary storage system, the second metadata associated with content stored in the first secondary storage cluster, the third metadata associated with content stored in the second primary storage system, and the fourth metadata associated with content stored in the second secondary storage cluster; and provide, at the cloud service system, a unified metadata search interface for metadata associated with content stored in the first primary storage system, the second primary storage system, the first secondary storage cluster, and the second secondary storage cluster; and a memory coupled to the processor and configured to provide the processor with instructions.

15. The system of claim 14, wherein the first metadata associated with content stored in the first primary storage system includes metadata associated with one or more objects stored in the first primary storage system.

16. The system of claim 14, wherein the first metadata associated with content stored in the first primary storage system includes metadata associated with one or more objects backed up from the first primary storage system to the first secondary storage cluster.

17. The system of claim 14, wherein the metadata associated with content received from the plurality of different storage domains is received according to an update policy.

18. The system of claim 14, wherein to provide the unified metadata search interface, the processor is further configured to:

receive a request for one or more objects based on one or more metadata attributes;

determine one or more indexed objects matching the one or more metadata attributes; and provide an indication of the one or more indexed objects satisfying the request.

19. The system of claim 18, wherein the indication includes a corresponding location associated with the one or more indexed objects satisfying the request.

20. The system of claim 19, wherein the corresponding location includes a storage domain of the different storage domains.

21. A computer program product, the computer program product being embodied in a non-transitory computer readable storage medium and comprising instructions for:

receiving, at a cloud service system, metadata associated with content stored in a plurality of different storage domains, wherein the cloud service system receives the metadata associated with content stored in the plurality of different storage domains via a plurality of persistent connection virtualization containers, wherein each of the plurality of different storage domains includes a corresponding secondary storage cluster, wherein a first persistent connection virtualization container of the plurality of persistent connection virtualization containers maintains bidirectional communications between the cloud service system and a first secondary storage cluster associated with a first storage domain of the plurality of different storage domains and a second persistent connection virtualization container of the plurality of persistent connection virtualization containers maintains bidirectional communications between the cloud service system and a second secondary storage cluster associated with a second storage domain of the plurality of different storage domains, wherein the first secondary storage cluster provides to the cloud service system via the first persistent connection virtualization container, first metadata associated with content stored in a first primary storage system to which the first secondary storage cluster is associated and second metadata associated with content stored in the first secondary storage cluster and the second secondary storage cluster provides to the cloud service system via the second persistent connection virtualization container, third metadata associated with content stored in a second primary storage system to which the second secondary storage cluster is associated and fourth metadata associated with content stored in the second secondary storage cluster;

storing and indexing together, at the cloud service system, the first metadata associated with content stored in the first primary storage system, the second metadata associated with content stored in the first secondary storage cluster, the third metadata associated with content stored in the second primary storage system, and the fourth metadata associated with content stored in the second secondary storage cluster; and providing, at the cloud service system, a unified metadata search interface for metadata associated with content stored in the first primary storage system, the second primary storage system, the first secondary storage cluster, and the second secondary storage cluster.

* * * * *